(12) United States Patent
Nomura et al.

(10) Patent No.: US 8,907,758 B2
(45) Date of Patent: Dec. 9, 2014

(54) REACTOR, CONVERTER, AND ELECTRIC POWER CONVERTER

(75) Inventors: Yasushi Nomura, Osaka (JP); Miki Kitajima, Osaka (JP); Kouhei Yoshikawa, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 13/822,987

(22) PCT Filed: Sep. 2, 2011

(86) PCT No.: PCT/JP2011/070041
§ 371 (c)(1), (2), (4) Date: Mar. 13, 2013

(87) PCT Pub. No.: WO2012/039268
PCT Pub. Date: Mar. 29, 2012

(65) Prior Publication Data
US 2013/0182478 A1    Jul. 18, 2013

(30) Foreign Application Priority Data

Sep. 22, 2010 (JP) ................. 2010-211853
Jun. 23, 2011 (JP) ................. 2011-139614
Aug. 23, 2011 (JP) ................. 2011-181861

(51) Int. Cl.
H01F 27/24    (2006.01)
(52) U.S. Cl.
USPC ..................................... 336/212
(58) Field of Classification Search
USPC .......... 336/65, 83, 90, 96, 200, 232, 212, 233
See application file for complete search history.

(56) References Cited

U.S. PATENT DOCUMENTS 8,416,082 B2 *  4/2013  Sayegh et al. ............. 340/572.8
2009/0096694 A1 *  4/2009  Ito et al. ..................... 343/788

FOREIGN PATENT DOCUMENTS

JP    48-022741    3/1973
JP    2008-218732    9/2008

(Continued)

OTHER PUBLICATIONS

International Search Report in International Application No. PCT/JP2011/070041 dated Dec. 6, 2011.

*Primary Examiner* — Tuyen Nguyen
(74) *Attorney, Agent, or Firm* — Venable LLP; Michael A. Sartori; Tamatane J. Aga

(57) ABSTRACT

A small reactor with high heat-release performance is provided. A reactor (1) includes an assembly (10) and a case (4), the assembly (10) having a coil (2) and a magnetic core (3) at which the coil (2) is arranged, the case (4) housing the assembly (10). The case (4) includes a bottom plate (40) that contacts a fixing object when the reactor (1) is installed on the fixing object, a side wall (41) that is mounted on the bottom plate (40) with an adhesive and surrounds the assembly (10), and a junction layer (42) that fixes the coil (2) to an inner surface of the bottom plate (40). The bottom plate (40) is formed of a material with higher thermal conductivity than that of the side wall (41). The reactor (1) easily transfers heat of the coil (2) to the bottom plate (40) and hence has high heat-release performance because the reactor (1) includes the bottom plate (40) with the high thermal conductivity and the coil (2) is joined to the bottom plate (40) through the junction layer (42). Since the bottom plate (40) and the side wall (41) are integrated using the adhesive, the thicknesses of both the members (40, 41) can be decreased. Accordingly, the reactor (1) is small.

15 Claims, 8 Drawing Sheets

(56) References Cited

FOREIGN PATENT DOCUMENTS

| | | |
|---|---|---|
| JP | 2008-305854 | 12/2008 |
| JP | 2009-099596 | 5/2009 |
| JP | 2009-099793 | 5/2009 |
| JP | 2009-231495 | 10/2009 |
| JP | 2010-050408 | 3/2010 |
| WO | WO-2007/108201 A1 | 9/2007 |
| WO | WO-2011/132361 A1 | 10/2011 |

* cited by examiner (A)

(B)

REACTOR, CONVERTER, AND ELECTRIC POWER CONVERTER

TECHNICAL FIELD

The present invention relates to a reactor that is used for, for example, a component of an electric power converter, such as an on-vehicle direct current to direct current (DC-DC) converter mounted on a vehicle such as a hybrid electric vehicle. The invention also relates to a converter including the reactor, and an electric power converter including the converter. The invention more particularly relates to a reactor, a converter, and an electric power converter being small and having high heat-release performance.

BACKGROUND ART

A reactor is one of parts in a circuit that performs a step-up operation and a step-down operation of voltage. For example, PTL 1 discloses a reactor that is used for a converter mounted on a vehicle such as a hybrid electric vehicle. The reactor includes a coil, a ring-shaped magnetic core at which the coil is arranged, a case that houses an assembly of the coil and the magnetic core, and sealing resin with which the case is filled. The reactor is generally fixed to a fixing object such as a cooling base, and is used for cooling the coil etc., which generates heat while being energized.

The case is typically a die-cast product of aluminum. The case is fixed to the cooling base and is used as a heat-release path for the heat of the coil etc.

CITATION LIST

Patent Literature

PTL 1: Japanese Unexamined Patent Application Publication No. 2010-050408

SUMMARY OF INVENTION

Technical Problem

Recently, on-vehicle parts of a hybrid electric vehicle etc. are desired to be further reduced in size and weight. However, a reactor including a conventional aluminum case has difficulty in further reduction in size.

Since aluminum is a conductive material, aluminum has to be electrically insulated from at least the coil. Hence, a relatively large gap is generally provided between the coil and inner surfaces (a bottom surface and side wall surfaces) of the case to ensure an electrical insulation clearance. Since the insulation clearance is ensured, the reduction in size may be difficult.

For example, if the case is omitted, the size of the reactor can be reduced. However, since the coil and the magnetic core are exposed, the coil and the magnetic core cannot obtain protection from the external environment, such as dust and corrosion, or mechanical protection such as strength.

Also, sealing resin that is filled in the case is desired to have high heat-release performance. For example, if the sealing resin uses resin containing a filler made of ceramic, the heat-release performance can be increased. However, since the assembly including the coil and the magnetic core has a complicated external shape, if the case is filled with the resin containing the filler to avoid generation of a gap and a void between the assembly and the inner surfaces of the case, the filling step takes a time, and hence productivity of the reactor is degraded. In addition, although the heat-release performance can be increased by increasing the content rate of the filler in the sealing resin, the sealing resin becomes brittle and easily broken by a thermal shock. Therefore, a reactor having high heat-release performance without the sealing resin containing the filler is desired to be developed.

Accordingly, an object of the invention is to provide a small reactor having high heat-release performance. Another object of the invention is to provide a converter including the reactor, and an electric power converter including the converter.

Solution to Problem

The invention attains the above-described objects such that a case has a divided structure, and a junction layer that fixes a coil to an inner bottom surface of the case is provided.

The invention relates to a reactor including an assembly and a case, the assembly having a coil and a magnetic core at which the coil is arranged, the case housing the assembly. The case includes a bottom plate that contacts a fixing object when the reactor is installed on the fixing object, a side wall that is mounted on the bottom plate with an adhesive and surrounds the assembly, and a junction layer that fixes the coil to an inner surface of the bottom plate. Also, the bottom plate has a thermal conductivity that is equivalent to or higher than a thermal conductivity of the side wall.

With the reactor according to the invention, since a surface of the coil at an installation side when the reactor is installed on the fixing object is fixed to the bottom plate by the junction layer, heat of the coil can be efficiently transferred to the bottom plate. If the bottom plate is formed of the material with the thermal conductivity that is at least equivalent to or higher than the thermal conductivity of the side wall, heat from the surface of the coil at the installation side can be efficiently transferred to the fixing object such as a cooling base. Accordingly, with the reactor according to the invention, since the heat of the coil can be transferred to the fixing object through the bottom plate, heat-release performance is high. In particular, since the bottom plate and the side wall are separate members, both the members may be formed of different materials. For example, if the bottom plate is formed of a material with a higher thermal conductivity than that of the side wall, the reactor can have further high heat-release performance. If the thickness of the junction layer is decreased, the distance between the surface of the coil at the installation side and the inner surface of the bottom plate can be decreased. Also in this point of view, the heat-release performance of the reactor according to the invention can be increased.

Also, if the thickness of the junction layer is decreased and hence the distance is decreased, the reactor can be reduced in size. Further, since the bottom plate and the side wall are separate members, the materials of both the members can be easily changed. For example, if the side wall is formed of a material with high electrical insulation performance, the distance between the outer peripheral surface of the coil and the inner peripheral surface of the side wall can be also decreased. Accordingly, the reactor of the invention can be further reduced in size.

Also, in the reactor according to the invention, since the bottom plate and the side wall are separate members that are mounted to each other with the adhesive, the junction layer may be formed, for example, while the side wall is not mounted. For example, the junction layer may be formed on the inner bottom surface, on which the coil possibly contacts, of a conventional case in which the bottom surface and the side wall thereof are integrally molded and are not able to be separated. However, in this situation, the junction layer is difficult to be formed because the side wall disturbs the formation of the junction layer. In contrast, with the reactor according to the invention, the junction layer can be easily formed, and hence productivity of the reactor is high. Also, since the reactor according to the invention includes the case, protection from the environment and mechanical protection can be provided for the coil and the magnetic core.

Also, since the bottom plate and the side wall are fixed with the adhesive, if the case is filled with the sealing resin, the adhesive can prevent the sealing resin, which is not hardened, from leaking to the outside of the case from between the bottom plate and the side wall regardless of the viscosity and relative density of the sealing resin. Further, since the bottom plate and the side wall are fixed with the adhesive, the configurations and assembly step of both the members can be simplified.

Herein, any of various methods may be used for a method of integrally mounting the bottom plate and the side wall. For example, a clamping member such as a bolt may be used. However, in this situation, it is difficult to reduce the size of the reactor. For example, bolt holes may be provided at the bottom plate and the side wall, bolts may be screwed into the bolt holes, and hence both the members may be integrally fixed. Also, if the case is filled with the sealing resin, a packing may be preferably arranged to prevent the sealing resin, which is not hardened, from leaking to the outside from between the bottom plate and the side wall. If the thickness of the bottom plate and the thickness of the side wall are small, when the bottom plate and the side wall area fixed by the bolts, the bottom plate and the side wall may be deformed. If both the bottom plate and the side wall are deformed, the depressed amount of the packing may be uneven, and the sealing resin may leak from a portion with a small depressed amount. Owing to this, to prevent the deformation of the bottom plate and the side wall, the thicknesses of both the members have to be increased, and portions around the bolts penetrating through the members have to be increased as compared with the other portions. If the thicknesses are increased, it is difficult to reduce the size of the reactor.

Also, when the bottom plate and the side wall are fixed by the bolts, if the viscosity of the sealing resin is small, the sealing resin may leak to the outside of the case from between the bottom plate and the side wall although the packing is arranged. As long as the viscosity of resin is decreased when the resin is heated, when the sealing resin is heated at a high temperature, the usable kind of sealing resin is limited to prevent the leakage. Hence, a mounting method of both the members is desired, the method which can prevent the sealing resin from leaking to the outside of the case from between the bottom plate and the side wall regardless of the kind of sealing resin.

With the reactor according to the invention, since the bottom plate and the side wall are mounted with the adhesive as described above, the bolts and the packing may be omitted. Since the bolts are not used, the thickness of the fixing portions does not have to be increased, and the thickness of the bottom plate and the thickness of the side wall can be decreased. Also in this point of view, the reactor according to the invention can be reduced in size. With the reactor according to the invention, the adhesive can prevent the sealing resin from leaking regardless of the specification of the elastic member such as the packing or the viscosity of the sealing resin. Accordingly, the degree of freedom for selection of usable sealing resin can be increased. Further, with the reactor according to the invention, the clamping member such as the bolt and the elastic member such as the packing can be omitted, and the working steps of forming the bolt hole and assembling can be omitted. Accordingly, productivity is high.

There may be an aspect of the invention, in which the junction layer is formed of an insulating material with a thermal conductivity of 0.1 W/m·K or higher. "Insulation performance" of the insulating material indicates a voltage-resistant characteristic that can provide electrical insulation between the coil and the bottom plate.

With the aspect, since the junction layer is formed of the insulating material, even if the bottom plate is formed of a conductive material, insulation can be reliably provided between the coil and the bottom plate because the coil contacts the junction layer. Accordingly, with the aspect, the thickness of the junction layer can be sufficiently decreased. In this point of view, heat of the coil is easily transferred to the fixing object, and hence heat-release performance is high. As the thermal conductivity is higher, the heat-release performance is increased. Hence, the aspect may include the junction layer formed of an insulating material with a thermal conductivity of 0.15 W/m·K or higher, more preferably an insulating material with a thermal conductivity of 0.5 W/m·K or higher, or further preferably an insulating material with a thermal conductivity of 1 W/m·K or higher.

In particular, if the junction layer is formed of a material with a thermal conductivity higher than 2 W/m·K, such a junction layer has a high thermal conductivity. Even if the thickness of the junction layer is large by a certain degree, the reactor can have high heat-release performance. As the thickness of the junction layer is increased, insulation performance is increased. With the aspect including the junction layer with high heat-release performance, heat can be efficiently released from at least the surface at the installation side of the coil through the junction layer. For example, if the case is filled with the sealing resin, the junction layer increases heat-release performance although the sealing resin uses resin with a low thermal conductivity. Accordingly, with the aspect including the junction layer with the high heat-release performance, the degree of freedom for selection of usable sealing resin is increased, and, for example, resin not containing a filler may be used. Alternatively, even if the sealing resin is not provided, the junction layer with high heat-release performance can ensure sufficient heat-release performance.

There may be an aspect of the invention, in which at least one of the bottom plate and the side wall has a weir that prevents the adhesive from leaking to outside of the case from between the bottom plate and the side wall when the side wall is mounted on the bottom plate.

If the both the bottom plate and the side wall are fixed through the adhesive arranged between the bottom plate and the side wall, the adhesive may leak from between the bottom plate and the side wall because the adhesive is spread by the bottom plate and the side wall before the adhesive is hardened depending on the amount and viscosity of the adhesive. In the aspect, the adhesive spread between the bottom plate and the side wall is stopped by the weir, and can be prevented from leaking to the outside of the case. Also, the weir can be used for positioning when the bottom plate and the side wall are fixed. Both the members are easily positioned. The weir may be provided each of both the members. In this situation, even if the adhesive is applied to both the bottom plate and the side wall, the adhesive can be prevented from leaking as described above. The weir may be provided at only one of the bottom plate and the side wall. If the weir is provided at only one of the bottom plate and the side wall, both the members can be fixed without being shifted from each other by fitting and mounting the side wall to the bottom plate so that the outer peripheral edge of the other of the bottom plate and the side wall is aligned with the inner peripheral edge of the weir provided at the one of the bottom plate and the side wall.

There may be an aspect of the invention, in which at least one of the bottom plate and the side wall has an adhesive groove that is filled with the adhesive.

Since the adhesive groove that is filled with the adhesive is provided, the adhesive groove serves as a mark for an application portion of the adhesive. Accordingly, the adhesive is easily applied. Also, the adhesive groove can be filled with the adhesive by a constant amount, and hence the adhesive can be sufficiently applied. Since the adhesive is present in the adhesive groove, the contact area between the bottom plate and the side wall can be increased. Both the bottom plate and the side wall can be further firmly fixed.

The adhesive groove may be provided at least at only one of the bottom plate and the side wall, or may be provided at each of both the members. If the adhesive groove is provided at the bottom plate, the adhesive groove is easily filled with the adhesive. In contrast, if the adhesive groove is provided at the side wall, since the thickness of the bottom plate can be decreased, heat is easily transferred to the fixing object such as the cooling base, and the heat-release performance of the reactor can be increased. If the adhesive groove is provided at each of the bottom plate and the side wall, the contact area between the bottom plate and the side wall can be increased, and hence both the members can be firmly fixed.

There may be an aspect of the invention, in which at least one of the bottom plate and the side wall has a flat surface that contacts the adhesive.

Since the surface that contacts the adhesive is flat, the configuration of the bottom plate or the side wall can be simplified. In particular, since the thickness of the bottom plate can be decreased, heat is easily transferred to the fixing object such as the cooling base, and the heat-release performance of the reactor can be increased.

There may be an aspect of the invention, in which the side wall has a guide at an inner side thereof, the guide positioning the assembly.

Since the guide is provided at the inner side of the side wall, when the assembly is fixed to the bottom plate, positioning is easily performed. The side wall can be positioned with respect to the bottom plate, and the assembly can be positioned with respect to the guide provided at the side wall. Hence, the three parts of the bottom plate, the side wall, and the assembly can be easily positioned without using a jig for positioning the three parts.

There may be an aspect of the invention, in which the junction layer has at least a single adhesive layer that is formed of an insulating adhesive, and the bottom plate is formed of a conductive material.

Since the junction layer has the adhesive layer formed of the insulating adhesive, adhesion between the coil and the junction layer is increased. In particular, if the adhesive layer has a multi-layer structure, even if the thickness of a single adhesive layer is small, electrical insulation performance is increased. If the thickness of the adhesive layer is decreased as possible, the distance between the coil and the bottom plate is decreased. Accordingly, the heat-release performance can be increased, and the reactor can be reduced in size. However, if the thickness of the adhesive layer is decreased, a pinhole may be present. In contrast, since the multi-layer structure is provided, a pinhole in a certain layer can be closed with another adjacent layer. Accordingly, the junction layer with high insulation performance can be provided. The thickness of a single adhesive layer and the number of layers may be properly selected. As the total thickness is larger, the insulation performance is increased. As the thickness is smaller, the heat-release performance is increased. If the material with high insulation performance is used, sufficient heat-release performance and insulation performance can be provided even if the thickness of each adhesive layer is small and the number of staked layers is small. For example, the junction layer may be formed such that the total thickness of the adhesive layers is smaller than 2 mm, more preferably 1 mm or smaller, or further preferably 0.5 mm or smaller. Also, if the bottom plate is formed of a conductive material, or typically metal such as aluminum, since metal generally has high heat-release performance, the heat-release performance of the reactor is further increased. Also, even when the bottom plate is formed of the conductive material, since the junction layer includes the adhesive layer formed of the insulating material, electrical insulation between the coil and the bottom plate can be ensured.

There may be an aspect of the invention, in which the adhesive is the same as the insulating adhesive that forms the junction layer.

If the adhesive that fixes the bottom plate and the side wall is the same as the insulating adhesive that forms the junction layer (the adhesive layer), for example, the adhesive layer which fixes the bottom plate and the side wall, and the junction layer can be simultaneously and integrally formed by applying the insulating adhesive on the entire inner surface of the bottom plate. Accordingly, the adhesive that fixes the bottom plate and the side wall does not have to be additionally applied to the side wall. Also, when the coil contacts the junction layer, the bottom plate contacts the side wall, and the contact portions are fixed, the adhesive can be simultaneously hardened. Accordingly, the step of applying the adhesive and the step of hardening the adhesive can be simplified, and this aspect provides good productivity of the reactor.

There may be an aspect of the invention, in which the adhesive is different from the insulating adhesive that forms the junction layer.

Since the adhesive that fixes the bottom plate and the side wall is different from the insulating adhesive that forms the junction layer (the adhesive layer), the degree of freedom for selection of usable adhesive is increased. For example, the adhesive that fixes the bottom plate and the side wall may be an adhesive that can firmly connect and fix both the bottom plate and the side wall regardless of the materials of the bottom plate and the side wall. The insulating adhesive that forms the junction layer may be an adhesive that can efficiently transfer the heat from the coil to the fixing object such as the cooling base through the junction layer. As described above, the adhesives which respectively meet the purposes of use can be used.

There may be an aspect of the invention, in which the junction layer and the adhesive are integrally formed of a sheet-shaped adhesive arranged on the inner surface of the bottom plate.

Since the sheet-shaped adhesive is used, arrangement work of the adhesive that fixes the junction layer or the bottom plate and the side wall becomes easy, and this aspect provides good productivity of the reactor. In particular, if the size of the sheet-shaped adhesive is adjusted, a single sheet-shaped adhesive can easily integrally form the adhesive layer that fixes the bottom plate and the side wall, and the junction layer. Accordingly, this aspect provides good productivity of the reactor. Also, in this aspect, since the contact surfaces of the adhesive at the bottom plate and the side wall can be flat, the shapes of the bottom plate and the side wall can be simple shapes.

There may be an aspect of the invention, in which the side wall is formed of an insulating material.

Since the side wall is formed of the insulating material, insulation is provided between the side wall and the coil. Accordingly, the distance between the inner surface of the side wall and the outer peripheral surface of the coil is decreased, and the size can be further reduced. Also, if the insulating material is a material such as resin having a smaller weight than that of a metallic material, a case with a smaller weight than that of the conventional aluminum case can be provided. It is to be noted that the side wall may be formed of a conductive material such as aluminum like the bottom plate. In this situation, the heat-release performance can be increased. Also, in this situation, since the case is formed of the conductive non-magnetic material, the case functions as a magnetic shield, and a leakage flux can be restricted.

There may be an aspect of the invention, in which the junction layer has a multi-layer structure formed of an epoxy-base adhesive containing a filler formed of alumina, the bottom plate is formed of a material selected from aluminum and an aluminum alloy, and the side wall is formed of insulating resin.

The epoxy-base adhesive containing the filler formed of alumina has both high insulation performance and high heat-release performance. For example, the epoxy-base adhesive can satisfy the thermal conductivity of 3 W/m·K or higher. Accordingly, this aspect provides high heat-release performance. Also, with the multi-layer structure, high electrical insulation performance can be ensured even if the thickness of each adhesive layer is decreased as described above. Also, since the thickness of each adhesive layer is decreased, the reactor can be reduced in size as described above. Further, aluminum or an aluminum alloy has high thermal conductivity (aluminum: 237 W/m·K). Accordingly, with the aspect including the bottom plate formed of aluminum or the like, the heat of the coil can be efficiently transferred to the fixing object such as the cooling base while the bottom plate serves as a heat-release path, and hence heat-release performance is high. Also, with this aspect including the side wall formed of the insulating resin, since the distance between the coil and the side wall is decreased as described above, the reactor can be further reduced in size.

The reactor according to the invention can be preferably used for a component of a converter. A converter according to an aspect of the invention includes a switching element, a driving circuit that controls an operation of the switching element, and a reactor that makes a switching operation smooth, the converter converting an input voltage by the operation of the switching element. The reactor is the reactor according to the invention. The converter according to the invention can be preferably used for a component of an electric power converter. An electric power converter according to an aspect of the invention includes a converter that converts an input voltage, and an inverter that performs conversion between direct current and alternating current, the electric power converter driving a load with power converted by the inverter. The converter is the converter according to the invention.

The converter according to the invention and the electric power converter according to the invention include the small reactor with high heat-release performance according to the invention. Accordingly, the converter and the electric power converter can be compact.

Advantageous Effects of Invention

The reactor according to the invention is small and has high heat-release performance.

DESCRIPTION OF EMBODIMENTS

Figure 1:
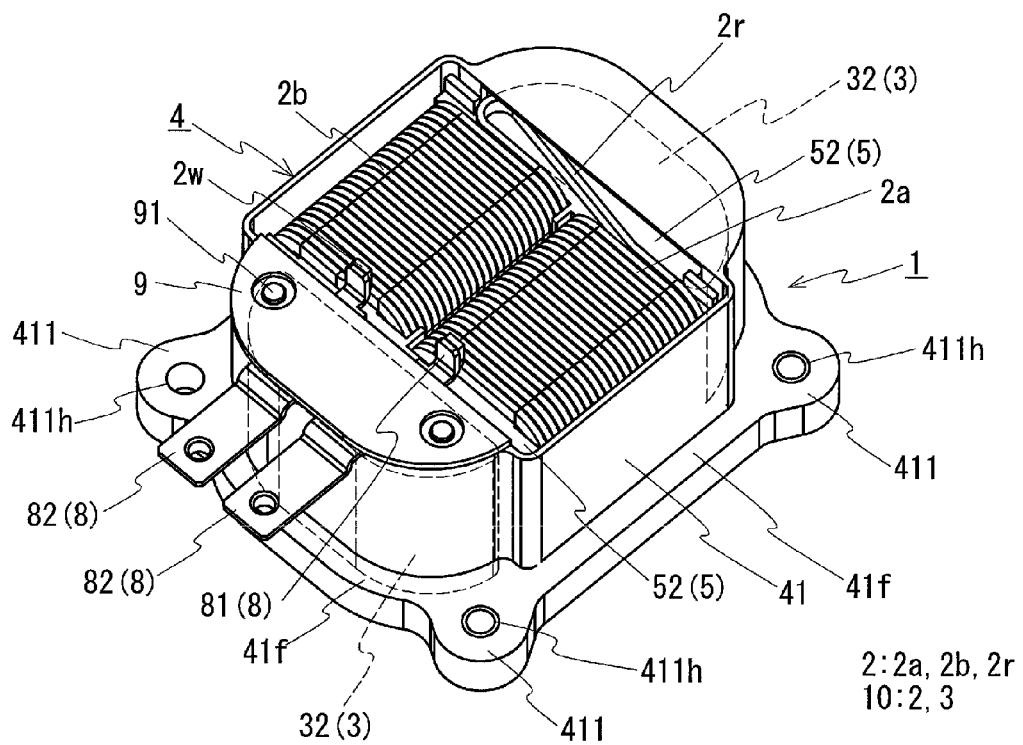
FIG. 1 is a brief perspective view showing a reactor according to a first embodiment.

Embodiments of the invention are described below with reference to the drawings. Like reference signs refer to like members in the drawings. In the following description, when a reactor is installed, an installation side is described as a lower side, and a side opposite to the installation side is described as an upper side.

First Embodiment

A first embodiment of the invention is described with reference to FIGS. 1 to 4. In FIG. 4, a side wall is illustrated in an exaggerated manner for convenience of the description.

General Configuration

A reactor 1 includes an assembly 10 having a coil 2 and a magnetic core 3 at which the coil 2 is arranged, and a case 4 that houses the assembly 10. The case 4 is a box with one surface being open, and is typically filled with sealing resin (not shown). The assembly 10 is buried in the sealing resin except ends of a wire 2w that forms the coil 2. One of features of the reactor 1 is that the case 4 can be divided when the reactor 1 is manufactured. The respective components are described below in more detail.

Assembly

Coil

The coil 2 is described with reference to FIGS. 2 and 3. The coil 2 includes a pair of coil elements 2a and 2b formed by winding the wire 2w, which is a single continuous wire without a junction portion, and a coil coupling portion 2r that couples both the coil elements 2a and 2b. The coil elements 2a and 2b have the same number of coil turns and have substantially rectangular shapes (end-surface shapes) when viewed in the axial directions thereof. Both the coil elements 2a and 2b are arranged side by side so that the axial directions thereof are parallel to each other. The wire 2w is partly bent in a U-like shape at the other end side of the coil 2 (at a far side in paper face of FIG. 3) and hence forms the coil coupling portion 2r. With this configuration, both the coil elements 2a and 2b have the same winding direction.

The wire 2w is preferably a coated wire having an insulating coating made of an insulating material on the outer periphery of a conductor made of a conducting material such as copper or aluminum. In this embodiment, the wire 2w is a coated rectangular wire in which the conductor is made of a copper rectangular wire and the insulating coating is made of enamel (typically, polyamideimide). The thickness of the insulating coating is preferably in a range from 20 to 100 µm. As the thickness is larger, a pinhole can be reduced, thereby increasing electrical insulation performance. Both the coil elements 2a and 2b are each formed by winding the coated rectangular wire edgewise into a hollow rectangular-tube shape. The wire 2w may not be the wire in which the conductor is the rectangular wire, and may be a wire with any of various cross sections, such as a circular cross section, an elliptic cross section, and a polygonal cross section. The rectangular wire likely forms a coil with a larger space factor than the space factor of a coil formed of a circular wire with a circular cross section. Alternatively, the coil elements may be respectively formed by different wires, and ends of the wires respectively forming the coil elements may be joined by, for example, welding to form an integrated coil.

Both ends of the wire 2w forming the coil 2 are properly extended from turn forming portions at one end side of the coil 2 (at a near side in paper face of FIG. 3), and are extended to, for example, the outside of the case 4 (FIG. 1). The insulating coatings of both ends of the extended wire 2w are removed and conductor portions are exposed. Terminal pieces 8 made of a conductive material are connected to the exposed conductor portions. An external device (not shown), such as a power supply that supplies electric power to the coil 2, is connected through the terminal pieces 8. The terminal pieces 8 are described later in detail.

Magnetic Core

Figure 2:
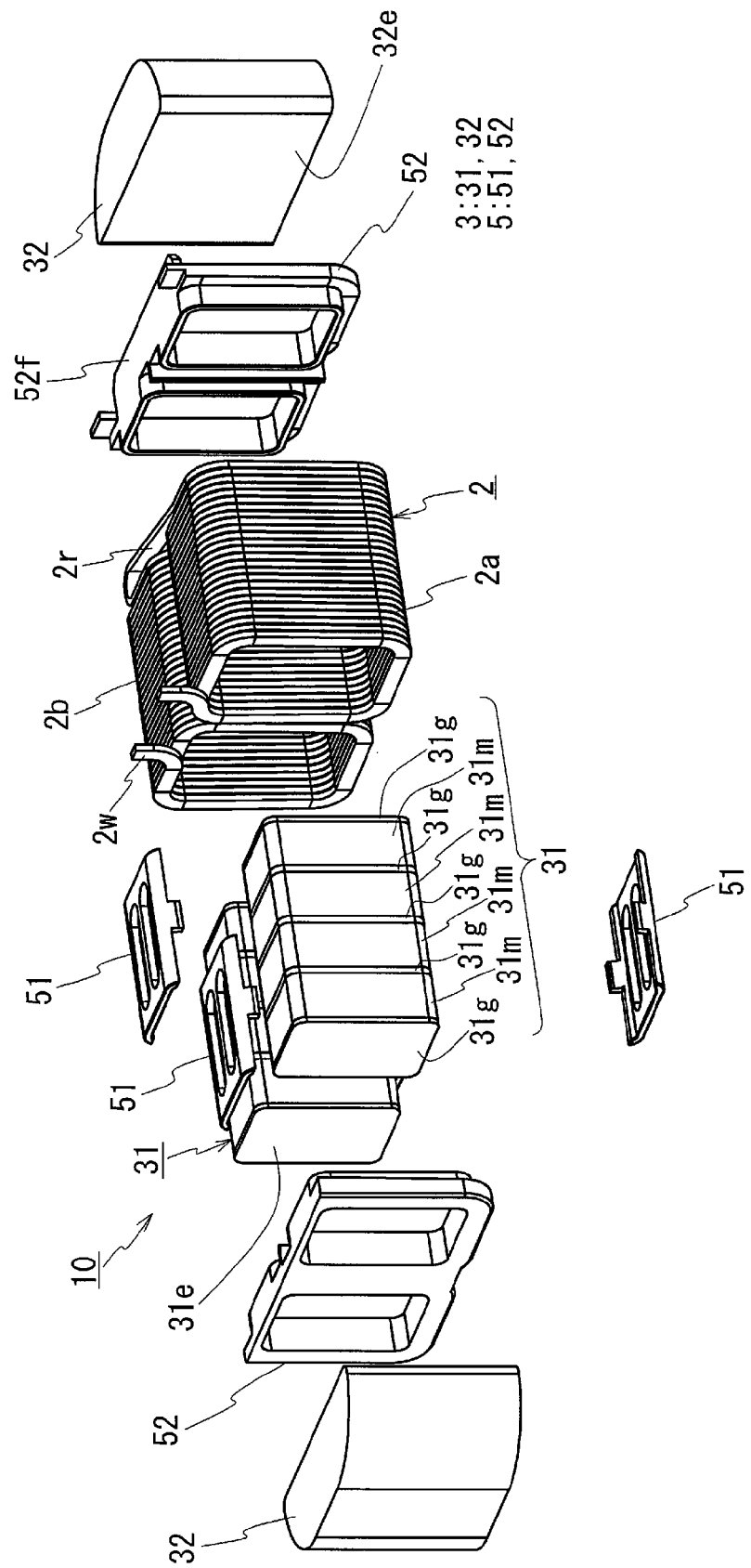
FIG. 2 is an exploded perspective view briefly showing an assembly of a coil and a magnetic core included in the reactor according to the first embodiment.

The magnetic core 3 is described appropriately with reference to FIG. 2. The magnetic core 3 includes a pair of inner cores 31 at which the coil elements 2a and 2b are respectively arranged, and a pair of outer cores 32 at which the coil 2 is not arranged and which are exposed from the coil 2. The inner cores 31 each have a rectangular-parallelepiped shape, and the outer cores 32 each have a prism shape with a pair of trapezoidal surfaces. The magnetic core 3 has the ring shape such that the separately arranged inner cores 31 are arranged between the outer cores 32 and end surfaces 31e of the inner cores 31 contact inner end surfaces 32e of the outer cores 32. The inner cores 31 and the outer cores 32 form a closed magnetic circuit when the coil 2 is energized.

The inner cores 31 are each typically a stack formed by alternately stacking core pieces 31m made of a magnetic material and gap members 31g typically made of a non-magnetic material. The outer cores 32 are each a core piece made of a magnetic material. Each core piece may be a compact using magnetic powder, or a stack formed by stacking a plurality of magnetic thin sheets with insulating coatings (for example, electromagnetic steel sheets).

The compact may be a powder compact using powder made of a soft magnetic material, for example, an iron group metal, such as iron (Fe), cobalt (Co), or nickel (Ni); a Fe base alloy, such as ferrosilicon (Fe—Si), ferronickel (Fe—Ni), ferroaluminum (Fe—Al), ferrocobalt (Fe—Co), ferrochromium (Fe—Cr), or fellosiliconaluminum (Fe—Si—Al); rear earth metal; or an amorphous magnetic material. The compact may be alternatively a sintered compact formed by press-molding the powder and then sintering the powder. The compact may be further alternatively a hardened compact formed by injection-molding or cast-molding a mixture of the powder and resin. The core piece may be a ferrite core that is a sintered compact of metal oxide. The compact can easily form a magnetic core having any of various three-dimensional shapes.

The powder compact preferably uses a powder compact having an insulating coating on the surface of the powder made of the soft magnetic material. In this situation, the powder compact coated with the insulating coating can be obtained by molding the powder and then burning the powder at a heat-resistance temperature of the insulating coating or lower. The insulating coating may be typically a coating made of silicone resin or phosphate.

The material of the inner core 31 may be different from the material of the outer core 32. For example, if the inner core 31 is the powder compact or stack and the outer core 32 is the hardened compact, the saturation magnetic flux density of the inner core 31 becomes likely higher than that of the outer core 32. In this embodiment, each core piece is a powder compact of soft magnetic powder containing an iron, such as iron or steel.

The gap members 31g each are a sheet-shaped member arranged at the gap provided between the core pieces to adjust the inductance. The gap member 31g is made of a material with a lower magnetic permeability that that of the core piece, or typically a non-magnetic material (or possibly, an air gap). The material may be alumina, glass epoxy resin, or unsaturated polyester. Alternatively, if the gap member 31g is made of a mixed material in which magnetic powder (for example, ferrite, Fe, Fe—Si, or sendust) is dispersed in a non-magnetic material, such as ceramic or phenol resin, a leakage flux from the gap can be reduced. Further alternatively, the gap member 31g may be an air gap.

The number of core pieces and gap members may be properly selected so that the reactor 1 attains a desirable inductance. The shapes of the core piece and gap member may be properly selected.

If a coating layer made of an insulating material is provided on the outer peripheries of the inner cores 31, insulation between the coil 2 and the inner cores 31 can be increased. The coating layer is provided, for example, by arranging a heat-shrinkable tubing, a room-temperature-shrinkable tubing, an insulating tape, or insulating paper. If the shrinkable tubing is arranged on the outer peripheries of the inner cores 31 or the insulating tape is attached, the insulation performance can be increased and the core pieces and the gap members can be integrated.

In the magnetic core 3, a surface at the installation side of the inner cores 31 is not flush with a surface at the installation side of the outer cores 32. More specifically, when the reactor 1 is installed on a fixing object, the surface at the installation side of the outer cores 32 (hereinafter, referred to as core-installation surface, which is a lower surface in FIG. 2) protrude with respect to the installation surface of the inner cores 31. Also, the height of the outer cores 32 (the length in a direction perpendicular to the surface of the fixing object when the reactor 1 is installed on the fixing object (in this situation, a direction orthogonal to the axial direction of the coil 2, i.e., the up-down direction in FIG. 2)) is adjusted so that the core-installation surface of the outer cores 32 becomes flush with a surface at the installation side of the coil 2 (hereinafter, referred to as coil-installation surface, which is a lower surface in FIG. 2). Accordingly, the magnetic core 3 has an H-like shape when viewed from a side surface in a perspective manner when the reactor 1 is installed. Also, since the core-installation surface is flush with the coil-installation surface, not only the coil-installation surface of the coil 2, but also the core-installation surface of the magnetic core 3 can contact a junction layer 42 (FIG. 3, described later). Further, when the magnetic core 3 is assembled in the ring shape, side surfaces (near and far surfaces in paper face of FIG. 2) of the outer core 32 protrude outward with respect to side surfaces of the inner cores 31. Accordingly, the magnetic core 3 has an H-like shape also when viewed from the upper surface or the lower surface in a perspective manner when the reactor is installed (in FIG. 2, when the lower side is defined as the installation side). The magnetic core 3 with the above-described three-dimensional shape can be easily formed since the magnetic core 3 is made of the powder compact. In addition, the protruding portions of the outer cores 32 protruding with respect to the inner cores 31 can be used for paths of a magnetic flux.

Insulator

The assembly 10 includes insulators 5 between the coil 2 and the magnetic core 3, so that the insulation between the coil 2 and the magnetic core 3 is increased. The insulators 5 each include peripheral wall parts 51 arranged on the outer peripheries of the inner cores 31, and a pair of frame-shaped parts 52 that contact end surfaces of the coil 2 (surfaces at which the turns of the coil elements are viewed in the ring shapes).

Figure 7:
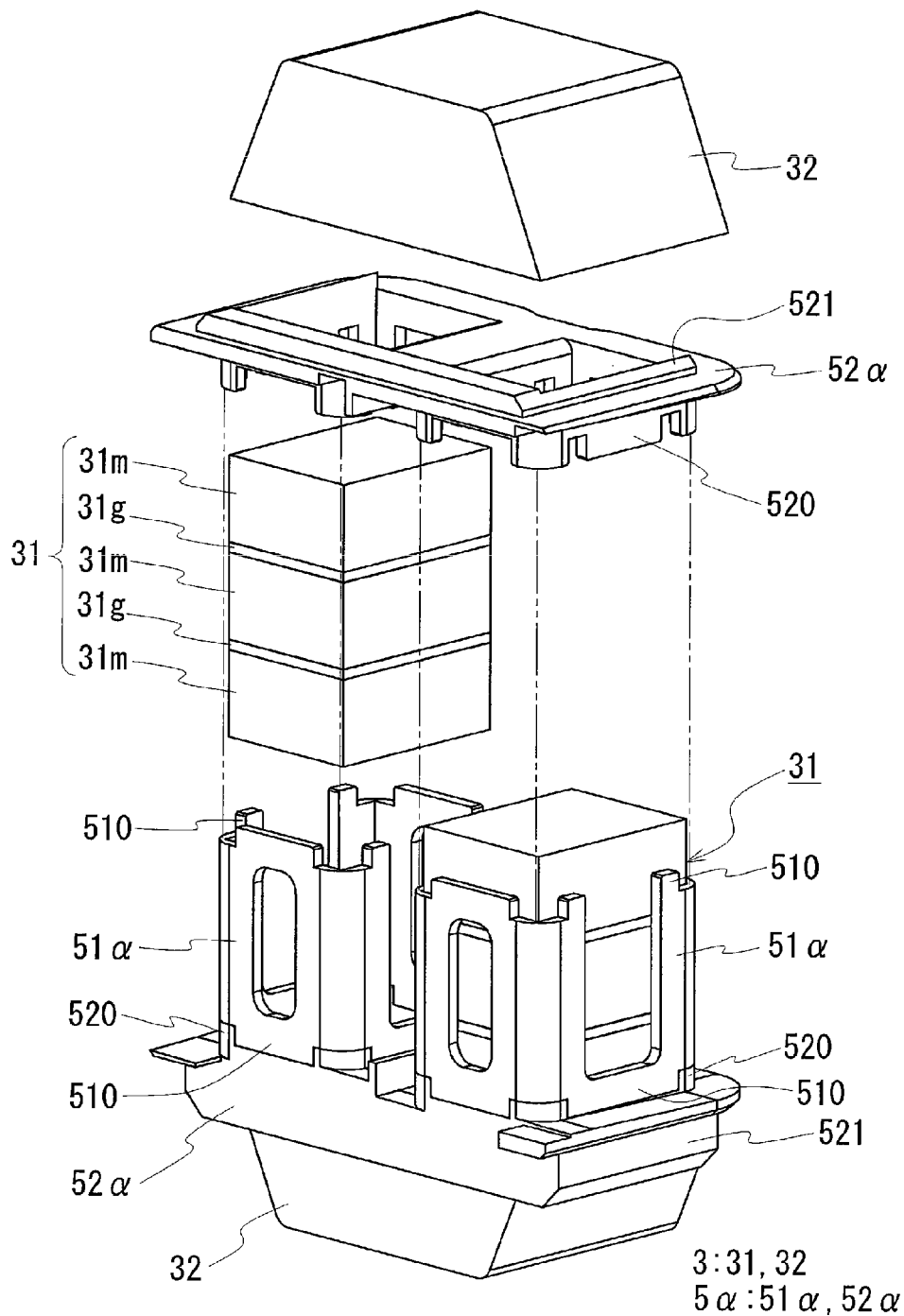
FIG. 7 is an exploded perspective view briefly showing another embodiment of an assembly of a coil and a magnetic core.

The peripheral wall parts 51 include a pair of members each having an angular-bracket-like cross section. The peripheral wall parts 51 do not contact each other, and are arranged only partly on the outer peripheral surface of each of the inner cores 31. The peripheral wall parts 51 may be a tube-shaped member arranged entirely over the outer peripheral surface of the inner core 31 (see FIG. 7, described later). However, as long as the insulation clearance is ensured between the coil 2 and the inner core 31, as shown in FIG. 2, the inner cores 31 may not be partly covered with the peripheral wall parts 51. In this situation, the peripheral wall parts 51 each use a peripheral wall part having windows penetrating through the front and back sides of the peripheral wall part.

Since the inner core 31 is partly exposed from the peripheral wall parts 51, the material of the peripheral wall parts 51 can be reduced. Also, if the sealing resin is provided, as long as the peripheral wall parts 51 have the windows or the periphery of the inner core 31 is only partly covered with the peripheral wall parts 51, the contact area of the inner core 31 with the sealing resin can be increased, and air bubbles are easily removed when the sealing resin is injected. Accordingly, productivity of the reactor 1 is high.

The frame-shaped parts 52 each have a pair of openings through which the inner cores 31 are respectively inserted, and each include a short tube-shaped member protruding to the inner cores 31 so that the inner cores 31 are easily introduced. Also, the coil coupling portion $2r$ is arranged at one of the frame-shaped parts 52. The one frame-shaped part 52 includes a mount $52f$ that insulates the coil coupling portion $2r$ from the outer core 32.

The material of the insulator may be an insulating material, such as polyphenylene sulfide (PPS) resin, polytetrafluoroethylene (PTFE) resin, polybutylene terephthalate (PBT) resin, or a liquid crystal polymer (LCP).

Case

Figure 3:
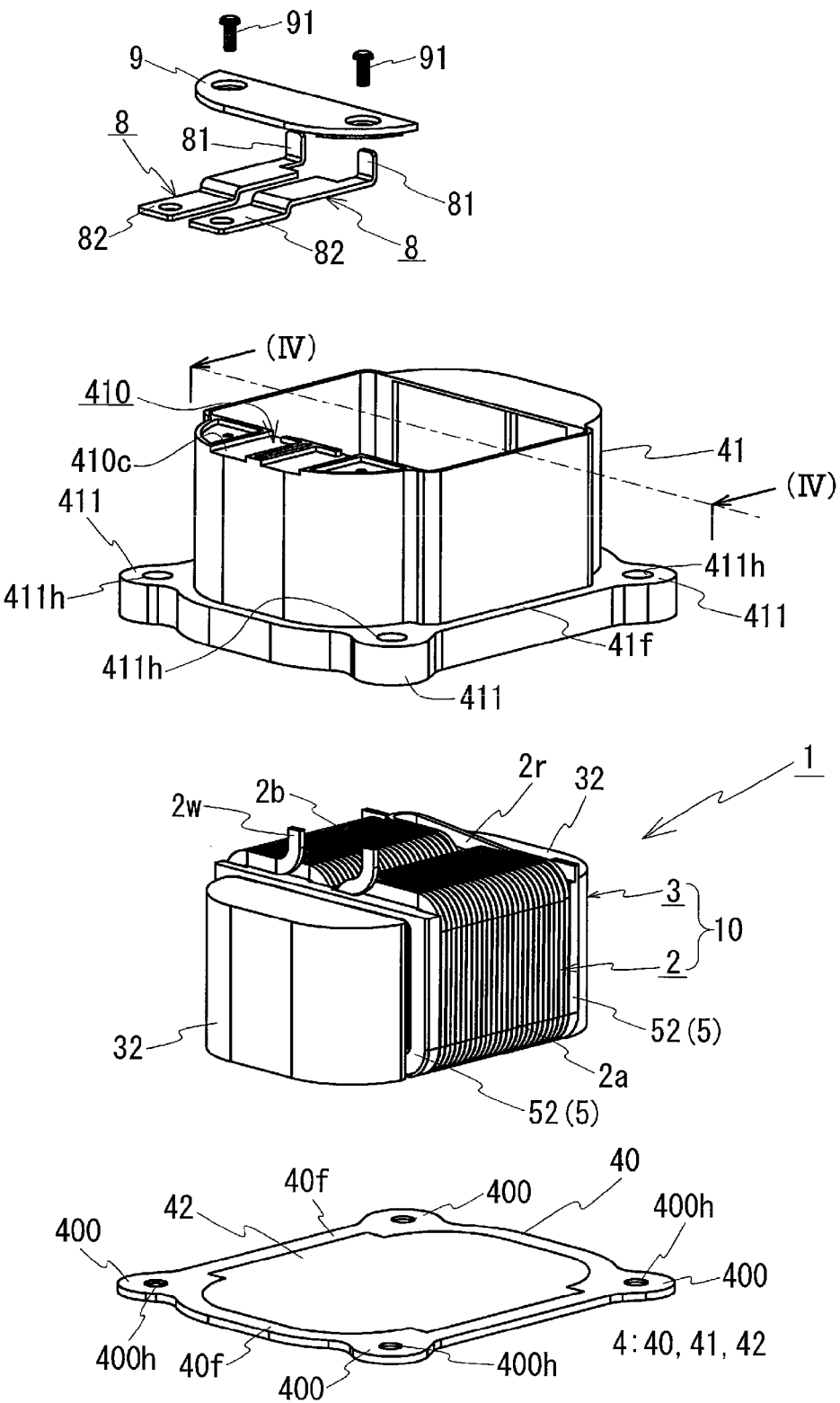
FIG. 3 is an exploded perspective view briefly showing the reactor according to the first embodiment.
Figure 4:
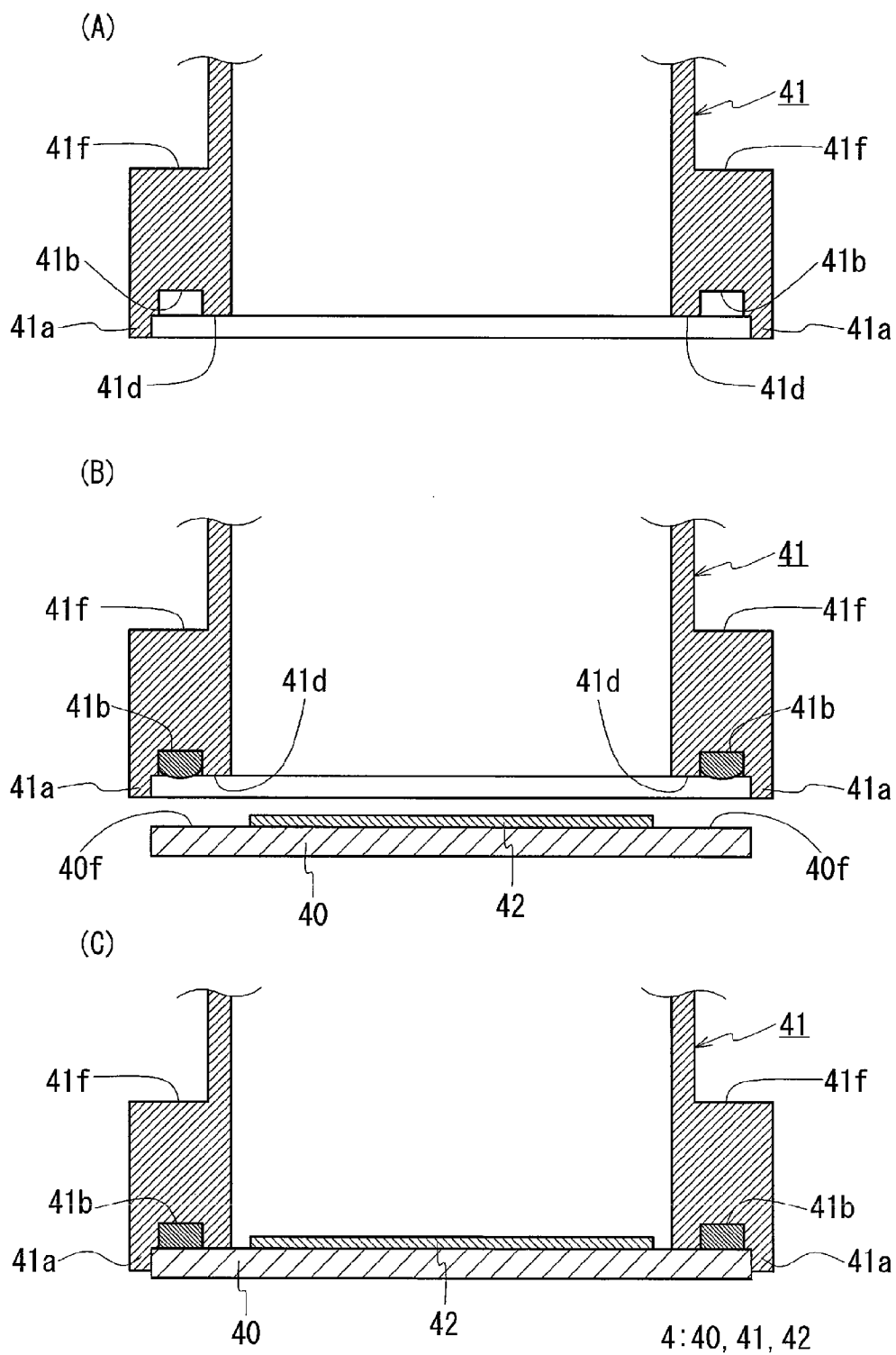
FIG. 4 each show a case of the reactor according to the first embodiment. Part (A) is a cross-sectional view taken along arrow IV-IV in FIG. 3 (enlarged view at an installation side of a side wall). Part (B) is a cross-sectional view of a state in which an adhesive groove is filled with an adhesive. Part (C) is a cross-sectional view of a state in which the side wall is fixed to a bottom plate.

The case 4 is described appropriately with reference to FIGS. 3 and 4. The case 4 that houses the assembly 10 including the coil 2 and the magnetic core 3 includes a plate-shaped bottom plate 40 and a frame-shaped side wall 41 vertically arranged on the bottom plate 40. One of features of the reactor 1 is that the bottom plate 40 and the side wall 41 are not integrally formed and are fixed with an adhesive, and the bottom plate 40 has a junction layer 42.

Bottom Plate and Side Wall

Bottom Plate

The bottom plate 40 is a rectangular plate and is arranged to be in contact with the fixing object when the reactor 1 is installed on the fixing object. An example in FIG. 3 shows the installation state in which the bottom plate 40 is located at the lower side. However, an installation state in which the bottom plate 40 is located at the upper side or a lateral side may be conceived. The bottom plate 40 has the junction layer 42 formed on a surface arranged at the inner side (inner bottom surface) when the case 4 is assembled. Also, the bottom plate 40 has a frame-shaped junction region $40f$ at the outer peripheral edge. The four corners of the junction region $40f$ respectively have mount portions 400 each protruding in a tongue shape. Each mount portion 400 has a bolt hole $400h$ through which a bolt (not shown) that fixes the case 4 to the fixing object. The bolt holes $400h$ are provided continuously to bolt holes $411h$ of the side wall 41 (described later). The bolt holes $400h$ and $411h$ may be non-threaded through holes or threaded screw holes, and the numbers may be properly selected.

Side Wall

The side wall 41 is a rectangular frame-shaped part. When one of the openings is closed with the bottom plate 40 and the case 4 is assembled, the side wall 41 is arranged to surround the assembly 10, and the other opening is being open. In this situation, the side wall 41 has a rectangular shape extending along the external shape of the bottom plate 40 in a region at the installation side when the reactor 1 is installed on the fixing object, and has a curved shape extending along the outer peripheral surface of the assembly 10 including the coil 2 and the magnetic core 3 in a region at the opening side. In the state in which the case 4 is assembled, the outer peripheral surface of the coil 2 is arranged close to the inner peripheral surface of the side wall 41. The distance between the outer peripheral surface of the coil 2 and the inner peripheral surface of the side wall 41 is as very small as being a range from about 0 to 1.0 mm. Also, in this situation, roof portions are provided in the region at the opening side of the side wall 41, and are arranged to cover the trapezoidal surfaces of the outer cores 32 of the assembly 10. Regarding the assembly 10 housed in the case 4, the coil 2 is exposed as shown in FIG. 1, and the magnetic core 3 is substantially covered with the material of the case 4. Since the roof portions are provided, vibration resistance is increased, rigidity of the case 4 (the side wall 41) is increased, and also, protection from the external environment and mechanical protection of the assembly 10 can be provided. Alternatively, the above-described roof portions may be omitted, and at least one of the trapezoidal surfaces of both the outer cores 32 may be exposed together with the coil 2.

Terminal Block

In the region at the opening side of the side wall 41, a portion that covers the upper side of one of the outer cores 32 as shown in FIG. 3 functions as a terminal block 410 to which the terminal pieces 8 are fixed.

The terminal pieces 8 are each a rectangular plate member including a welding surface 81 that is connected to an end of the wire 2w forming the coil 2, a connection surface 82 that makes connection to an external device such as a power supply, and a coupling portion that couples the welding surface 81 with the connection surface 82. As shown in FIG. 3, the terminal piece 8 is bent into an appropriate shape. The connection between the conductor portion of the wire 2w and the terminal piece 8 may use welding such as tungsten-inert-gas (TIG) welding or contact bonding etc. The shape of the terminal piece 8 is a mere example, and may use any appropriate shape.

The terminal block 410 has recessed grooves 410c at which the coupling portions of the terminal pieces 8 are arranged. The upper sides of the terminal pieces 8 fitted to the recessed grooves 410c are covered with a terminal fixing member 9. By clamping the terminal fixing member 9 with bolts 91, the terminal pieces 8 are fixed to the terminal block 410. The material of the terminal fixing member 9 may use preferably an insulating material such as insulating resin that is used for the material of the case (described later). Alternatively, the terminal block may be a separate member, and, for example, the terminal block may be fixed to the side wall. When the side wall is formed of an insulating material (described later), if the terminal pieces are formed by insert molding, the side wall, the terminal pieces, and the terminal block may be integrated.

Coupling Portion

In the region at the installation side of the side wall 41, a flange 41f is provided to surround the outer periphery of the side wall 41, for coupling the side wall 41 with the bottom plate 40. The flange 41f has a shape and a size similar to those of the junction region 40f provided at the bottom plate 40. The flange 41f may be formed of only the material of the side wall 41. Alternatively, a frame-shaped part corresponding to the outer peripheral edge at the installation side of the side wall 41 may be formed of a different material and arranged.

Mount Portion

The flange 41f includes mount portions 411 that fix the case 4 to the fixing object such as a cooling base. The mount portions 411 are formed to respectively protrude from the four corners of the flange 41f, like the bottom plate 40. The mount portions 411 each have a bolt hole 411h. The bolt hole 411h may be formed of only the material of the flange 41f. Alternatively, a tube member formed of a different material may be formed and arranged.

Coupling Configuration

The bottom plate 40 and the side wall 41 are coupled and integrated with each other with an adhesive. The coupling configuration may be a configuration in which at least one of the bottom plate 40 and the side wall 41 includes a weir that prevents the adhesive to leak to the outside of the case 4 from between the bottom plate 40 and the side wall 41 when the side wall 41 is mounted on the bottom plate 40. Also, a configuration may be provided in which at least one of the bottom plate 40 and the side wall 41 has an adhesive groove that is filled with the adhesive.

Weir

The weir prevents the adhesive to leak to the outside of the case 4 from between the bottom plate 40 and the side wall 41 when the side wall 41 is mounted on the bottom plate 40 with the adhesive. The weir is preferably formed at the side wall 41 or the bottom plate 40. In this example, a weir 41a is provided at the flange 41f formed in the region at the installation side of the side wall 41. More specifically, as shown in FIG. 4, the flange 41f has a ring-shaped member that protrudes from a bottom surface 41d, which contacts the bottom plate 40 when the side wall 41 is mounted on the bottom plate 40, toward the bottom plate 40 and that is provided along the outer peripheral edge of the flange 41f. The outer peripheral edge of the ring-shaped member is formed continuously from the outer peripheral edge of the flange 41f. The inner peripheral surface of the ring-shaped member contacts the side surface of the bottom plate 40 when the side wall 41 is mounted on the bottom plate 40. The ring-shamed member functions as the weir 41a. In this example, the weir 41a has a rectangular cross-sectional shape. The cross-sectional shape of the weir 41a may be a polygonal shape other than the rectangular shape as long as a gap is not present between the inner peripheral edge of the weir 41a and the outer peripheral edge of the bottom plate 40 and the weir 41a can tightly press the side surface of the bottom plate 40. The weir 41a has a height (a protruding length from the bottom surface 41d) is equivalent to or smaller than the thickness of the bottom plate 40. In this example, the height of the weir 41a is smaller than the thickness of the bottom plate 40. The thickness of the weir 41a may be properly determined as long as a gap is not present between the inner peripheral edge of the weir 41a and the outer peripheral edge of the bottom plate 40 when the side wall 41 is mounted on the bottom plate 40 and the weir 41a can tightly press the side surface of the bottom plate 40. The weir 41a may be formed of only the material of the flange 41f. Alternatively, a frame-shaped part corresponding to the outer peripheral edge at the installation side of the flange 41f may be formed of a different material and arranged. In the former situation, the weir 41a is preferably integrally molded with the flange 41f. In the latter situation, the weir is preferably mounted to the flange 41f by using, for example, an adhesive or a bolt.

When the weir is provided at the bottom plate 40, a ring-shaped member is provided typically such that the ring-shaped member protrudes from one surface (in FIG. 4, the upper surface) of the bottom plate 40 toward the side wall 41 at the outer peripheral edge of the bottom plate 40 and extends along the outer peripheral edge of the bottom plate 40. The ring-shaped member preferably serves as the weir. In this situation, since the weir is formed at the outer peripheral edge of the bottom plate 40, the bottom plate 40 has a pan shape. Even when the weir is provided at the bottom plate 40, the weir may be formed of only the material of the bottom plate 40, or alternatively, the weir may be formed of a different material, and combined with the bottom plate 40. When the weir is formed of a different material, the ring-shaped member may be arranged so that the inner peripheral surface of the ring-shaped member contacts the side surface of the bottom plate 40, or the ring-shaped member may be arranged on the upper surface of the bottom plate 40. The weir provided at the bottom plate 40 may have any cross-sectional shape as long as a gap is not present between the inner peripheral edge of the weir and the outer peripheral edge of the side wall 41 (the flange 41*f*) and the weir can tightly press the side surface of the side wall 41 (the flange 41*f*). Also, the weir provided at the bottom plate 40 may preferably have a protruding length from one surface of the bottom plate 40 (a height at a contact portion between the weir and the outer peripheral surface of the flange 41*f*) that is equivalent to or smaller than the height of the flange 41*f*. Alternatively, the weir may be formed at least at part of the outer peripheral edge of the side wall 41 or the bottom plate 40. That is, the weir does not have to be the ring-shaped member, and may be a C-shaped member or a configuration including a plurality of protruding pieces. Further alternatively, the weir may be a configuration that is not provided at the side wall 41 or the bottom plate 40.

Adhesive Groove

An adhesive groove is filled with an adhesive when the side wall 41 is mounted on the bottom plate 40 with the adhesive. In this example, as shown in FIG. 4, an adhesive groove 41*b* is formed in the flange 41*f* that is formed in the region at the installation side of the side wall 41. The adhesive groove 41*b* is formed along the shape of the flange 41*f*, and is a rectangular frame shape when the side wall 41 is viewed from the lower side. Since the flange 41*f* has the mount portions 411 (FIGS. 1 and 3) at the four corners, the adhesive groove 41*b* is formed also along the shapes of the mount portions 411. More specifically, the adhesive groove 41*b* is formed between the inner peripheral edge and the outer peripheral edge of the flange 41*f*, and surrounds the bolt holes 411*h* provided at the mount portions 411 at the four corners provided with the mount portions 411. The adhesive groove 41*b* may not be formed in areas between the outer peripheral edges of the mount portions 411 and the bolt holes 411*h*. In this example, the adhesive groove 41*b* (a recess) has a rectangular cross-sectional shape as shown in FIG. 4(A); however, the cross-sectional shape may be a semicircular shape or a polygonal shape other than the rectangular shape. The recessed amount (groove depth) may be properly determined as long as the recess (the groove) can be filled with the adhesive by an amount that sufficiently fixes the side wall 41 and the bottom plate 40. Alternatively, the adhesive groove may not be continuously formed.

The adhesive groove is preferably formed at least at one of the side wall 41 and the bottom plate 40. There may be the case in which the adhesive groove is formed at the side wall 41 (the flange 41*f*) as described above, a case in which an adhesive groove is formed at the bottom plate 40 (the junction region 40*f*), and a case in which adhesive grooves are formed at both the bottom plate 40 (the junction region 40*f*) and the side wall 41 (the flange 41*f*). Any of such adhesive grooves may have a shape similar to the adhesive groove formed at the flange 41*f*. A plurality of the adhesive grooves may be formed. For example, a plurality of adhesive grooves may be formed side by side at only one of the flange 41*f* and the junction region 40*f*, or a plurality of adhesive grooves may be formed side by side at both the flange 41*f* and the junction region 40*f*. If the adhesive grooves are formed at both the flange 41*f* and the junction region 40*f*, when both the members are assembled, the adhesive grooves of the side wall 41 and the bottom plate 40 may be arranged to face each other, or may be arranged in a shifted manner. Alternatively, both the flange 41*f* and the junction region 40*f* may not include the adhesive grooves.

If the adhesive groove is not provided, at least one of the side wall 41 and the bottom plate 40 may have a flat surface which contacts the adhesive. In this example, as shown in FIGS. 3 and 4, the surface, which contacts the adhesive, of the bottom plate 40 is flat. Alternatively, only the side wall 41 may be flat, or both the side wall 41 and the bottom plate 40 may be flat.

Material

If the material of the case 4 is, for example, a metallic material, since a metallic material generally has a high thermal conductivity, the case can have high heat-release performance. More specifically, such metal may be, for example, aluminum or its alloy; a magnesium (thermal conductivity: 156 W/m·K) or its alloy; copper (398 W/m·K) or its alloy; silver (427 W/m·K) or its alloy; or iron or austenitic-base stainless steel (for example, SUS304: 16.7 W/m·K). If aluminum, magnesium, or an alloy thereof is used, the case can have a small weight, and this can make contribution to reduction in weight of the reactor. In particular, aluminum or its alloy has high corrosion resistance, and may be preferably used for an on-vehicle part. If the case 4 is formed of the metallic material, the case 4 may be formed by casting such as die casting, or plastic working such as pressing.

Alternatively, the material of the case 4 may be a non-metallic material, such as polybutylene terephthalate (PBT) resin, urethane resin, polyphenylene sulfide (PPS) resin, or acrylonitrile butadiene styrene (ABS) resin. If the non-metallic material is used, since the non-metallic material generally has high electrical insulation performance, the insulation between the coil 2 and the case 4 can be increased. Also, the non-metallic material has a smaller weight than that of the metallic material. Thus, the weight of the reactor 1 can be reduced. If the resin is mixed with a filler made of ceramic (described later), the heat-release performance can be increased. If the case 4 is formed of the resin, injection molding may be preferably used.

The materials of the bottom plate 40 and the side wall 41 may be materials of the same kind. In this situation, both the members have equivalent thermal conductivities. Alternatively, since the bottom plate 40 and the side wall 41 are separate members, the materials of both the members may be different from each other. In this situation, in particular, if the materials of both the members are selected so that the thermal conductivity of the bottom plate 40, on which the coil 2 is placed, is larger than the thermal conductivity of the side wall 41, heat of the coil 2 and the magnetic core 3 arranged on the bottom plate 40 can be efficiently transferred to the fixing object such as the cooling base. In this situation, the bottom plate 40 is formed of aluminum and the side wall 41 is formed of PBT resin.

Junction Layer

The junction layer 42 is provided on the bottom plate 40, at a portion where the coil-installation surface of the coil 2 and the core-installation surface of the outer cores 32 contact each other. The material of the junction layer 42 allows the coil 2 to be fixed to the bottom plate 40, and typically an adhesive or resin. For example, the junction layer 42 may be formed by applying an adhesive or resin on the bottom plate 40, or by using screen printing. Alternatively, a sheet-shaped adhesive may be used. If the screen printing or the sheet-shaped adhesive is used, the junction layer 42 with a desirable shape can be formed with high precision. In particular, the sheet-shaped adhesive can easily form the junction layer 42 with the desirable shape, and hence provides good workability.

The junction layer 42 may have a single-layer structure or a multi-layer structure. With the multi-layer structure, the multiple layers may be formed of materials of different kinds or a material of the same kind. For example, multiple layers with the same material may be stacked by the screen printing, or sheet-shaped adhesives of different materials may be stacked. In either case of the single layer and the multiple layers, as the (total) thickness is smaller, the distance between the coil 2 and the bottom plate 40 becomes small, and accordingly, the heat-release performance can be increased and the size can be reduced. In contrast, as the thickness is larger, the coil 2 can be firmly held, and if an insulating material is used, the insulation between the coil 2 and the bottom plate 40 can be increased.

The more specific material of the junction layer 42 may be, for example, insulating resin. The insulating resin may be, for example, epoxy resin or acrylic resin. Insulating resin containing a filler made of ceramic (described later) may be used. Since the insulating resin contains the filler with high heat-release performance and high electrical insulation performance, the junction layer 42 with high heat-release performance and high electrical insulation performance can be formed. When the junction layer 42 is formed of the insulating resin, in particular, if an adhesive is used, this is preferable because adhesion between the coil 2 and the junction layer 42 can be increased. Alternatively, if a sheet-shaped adhesive formed by adding the filler with high heat-release performance and high electrical insulation performance to the insulating resin is used, the junction layer 42 with high heat-release performance and high electrical insulation performance can be further easily formed.

If the material of the junction layer 42 is, for example, an insulating material with a thermal conductivity higher than 2 W/m·K, the configuration can have high heat-release performance and high insulation performance. As the thermal conductivity is higher, the heat-release performance becomes higher. A material with a thermal conductivity of 3 W/m·K or higher, more preferably, a material with a thermal conductivity of 10 W/m·K or higher, further preferably, a material with a thermal conductivity of 20 W/m·K or higher, or yet preferably, a material with a thermal conductivity of 30 W/m·K or higher may be used. If a material containing the filler is used, the material and content of the filler may be adjusted to obtain a desirable thermal conductivity.

In addition to the junction layer 42, for example, a heat-release layer may be included. The specific material of the heat-release layer may be, for example, a non-metallic inorganic material such as ceramic, or more particularly, a kind of material selected from an oxide, a carbide, and a nitride of either of boron (B) and silicon (Si), which are metallic elements. A more specific ceramic may be silicon nitride ($Si_3N_4$) of about 20 to 150 W/m·K, alumina ($Al_2O_3$) of about 20 to 30 W/m·K, aluminum nitride (AlN) of about 200 to 250 W/m·K, boron nitride (BN) of about 50 to 65 W/m·K, or silicon carbide (SiC) of about 50 to 130 W/m·K. Such ceramic has high heat-release performance and high electrical insulation performance. If the ceramic forms the heat-release layer, for example, a deposition method, such as physical vapor deposition (PVD) or a chemical vapor deposition (CVD) may be used. Alternatively, the heat-release layer may be formed by joining a sintered plate of the ceramic on the bottom plate 40 with a proper adhesive. The junction layer 42 is formed on the heat-release layer. The heat-release layer made of ceramic has high insulation performance as described above. Hence, a reactor in which the coil 2 directly contacts the heat-release layer can be provided. The reactor has high heat-release performance and is small since only the heat-release layer is arranged between the coil 2 and the bottom plate 40.

When the junction layer 42 is formed of the insulating material, if the layer made of the ceramic as described above etc. is provided, insulation between the coil 2 and the bottom plate 40 can be ensured even if the junction layer 42 has a small thickness of 1 mm or smaller, or 0.5 mm or smaller. Since the junction layer 42 is thin, the heat-release performance can be increased. Alternatively, if the junction layer 42 is formed of a material with high heat-release performance, the heat-release performance is sufficiently high even if the junction layer 42 has a thickness of 0.5 mm or larger, or 1 mm or larger.

It is to be noted that the thickness of the junction layer 42 is a thickness when the junction layer 42 is formed. When the assembly 10 including the coil 2 and the magnetic core 3 is mounted, the thickness becomes smaller than that at the time of formation, and may be occasionally about 0.1 mm. This phenomenon occurs also when a sheet-shaped adhesive according to a third embodiment is used.

In this situation, the junction layer 42 is formed of an epoxy-base adhesive (an insulating adhesive) containing a filler made of aluminum (thermal conductivity: 3 W/m·K). Also, in this situation, the junction layer 42 has a two-layer structure of the above-described adhesive layers. A single layer has a thickness of 0.2 mm, and the total thickness is 0.4 mm. The shape of the junction layer 42 is not particularly limited as long as the junction layer 42 has an area that allows the coil-installation surface and the core-installation surface to sufficiently contact the junction layer 42. In this situation, the junction layer 42 has a shape along the shape defined by the coil-installation surface of the coil 2 and the core-installation surface of the outer cores 32 as shown in FIG. 2.

Sealing Resin

The case 4 may be filled with sealing resin (not shown) that is made of insulating resin. In this situation, the ends of the wire 2w are extended to the outside of the case 4, and are exposed from the sealing resin. The sealing resin may be, for example, epoxy resin, urethane resin, or silicone resin. Also, if the sealing resin contains a filler with high insulation performance and high thermal conductivity, for example, a filler made of at least one kind selected from silicon nitride, alumina, aluminum nitride, boron nitride, mullite, and silicon carbide, the heat-release performance can be further increased.

Manufacturing of Reactor

The reactor 1 with the above-described configuration may be manufactured as follows.

First, the assembly 10 including the coil 2 and the magnetic core 3 is formed. More specifically, the core pieces 31m and the gap members 31g are stacked and hence the inner cores 31 are formed as shown in FIG. 2, and the inner cores 31 are respectively inserted into the coil elements 2a and 2b while the peripheral wall parts 51 of the insulator 5 are arranged on the outer peripheries of the inner cores 31. The assembly 10 is formed by arranging the frame-shaped parts 52 and the outer cores 32 at the coil 2 so that the end surfaces of the coil elements 2a and 2b and the end surfaces 31e of the inner cores 31 are arranged between the frame-shaped parts 52 of the insulator 5 and between the outer cores 32. The end surfaces 31*e* of the inner cores 31 are exposed from the openings of the frame-shaped parts 52 and contact the inner end surfaces 32*e* of the outer cores 32.

Although the core pieces 31*m* and the gap members 31*g* may be joined and integrated with an adhesive, a tape, etc., in this embodiment, an adhesive is not used. Although the pair of peripheral wall parts 51 are not engaged with each other, the peripheral wall parts 51 are inserted into the coil elements 2*a* and 2*b* together with the inner cores 31, and the outer cores 32 are further arranged. Accordingly, the state in which the peripheral wall parts 51 are arranged between the inner peripheral surfaces of the coil elements 2*a*, 2*b* and the inner cores 31 is maintained, and the peripheral wall parts 51 do not fall.

On one hand, an aluminum sheet is punched into a predetermined shape as shown in FIG. 3, and the bottom plate 40 is formed. The junction layer 42 with a predetermined shape is formed on one surface of the bottom plate 40 (in this situation, screen printing is used). The assembly 10 assembled as described above is bonded and fixed onto the junction layer 42. Since the junction layer 42 is formed of the adhesive, the assembly 10 can be firmly fixed to the bottom plate 40.

On the other hand, the side wall 41 formed into a predetermined shape by injection molding or the like is mounted from the upper side of the assembly 10 to cover the outer peripheral surface of the assembly 10, and the bottom plate 40 and the side wall 41 are integrated with an adhesive. The adhesive is injected by using a syringe and a nozzle, and is applied to the adhesive groove 41*b* while the nozzle is moved (FIG. 4(B)). While the adhesive groove 41*b* is filled with the adhesive, the side wall 41 is mounted on the bottom plate 40 (see FIG. 4(C)). At this time, the side wall 41 is fitted to the bottom plate 40 so that the outer peripheral edge of the bottom plate 40 contacts the inner peripheral edge of the weir 41*a* formed at the side wall 41. Accordingly, both the members can be fixed without being shifted from each other. Then, even if the adhesive in the adhesive groove 41*b* is spread by the side wall 41 and the bottom plate 40 before the adhesive is hardened, the weir 41*a* prevents the adhesive from leaking to the outside of the case 4. In this state, the adhesive is hardened. The adhesive may be different from the adhesive that forms the junction layer 42. Adhesives with desirable characteristics may be used depending on the purposes of use. For example, the adhesive that forms the junction layer 42 uses an adhesive with high heat-release performance and high insulation performance, and the adhesive that integrates the side wall 41 with the bottom plate 40 uses an adhesive that can firmly join both the members. Since the outer cores 32 are covered with the terminal block 410 and the roof portions, and the roof portions serve as stoppers, the assembly 10 can be prevented from falling from the side wall 41. A position fixing portion or the like that prevents the outer cores 32 from falling may be additionally provided inside the terminal block 410 or the roof portions. In this step, the box-shaped case 4 is assembled, and the assembly 10 can be housed in the case 4 as shown in FIG. 1.

The welding surfaces 81 of the terminal pieces 8 are welded to the ends of the wire 2*w* protruding from the case 4, and the terminal pieces 8 are fitted to the recessed grooves 410*c* (FIG. 3) of the terminal block 410 (FIG. 3) of the side wall 41. Then, the coupling portions of the terminal pieces 8 are covered with the terminal fixing member 9, the terminal fixing member 9 is fixed to the side wall 41 by the bolts 91, and hence the terminal pieces 8 are fixed to the terminal block 410. With this step, the reactor 1 without the sealing resin is formed.

In contrast, if the case 4 is filled with the sealing resin (not shown) and the sealing resin is hardened, the reactor 1 having the sealing resin is formed. Alternatively, the terminal pieces 8 may be fixed to the terminal block 410 by the bolts 91, the case may be filled with the sealing resin, and then the ends of the wire 2*w* may be welded to the welding surface 81 of the terminal pieces 8.

Purpose of Use

The reactor 1 having the above-described configuration can be preferably used for a particular purpose of use under electricity application conditions in which a maximum current (direct current) is in a range from about 100 to 1000 A, an average voltage is in a range from about 100 to 1000 V, and a usable frequency is in a range from about 5 to 100 kHz, or typically, a component of an on-vehicle electric power converter in a vehicle such as an electric vehicle, a hybrid electric vehicle, etc.

Advantages

With the reactor 1 having the above-described configuration, since the coil 2 is joined to the bottom plate 40, which has the thermal conductivity equivalent to that of the side wall 41 or higher, by the junction layer 42, heat of the coil 2 and heat of the magnetic core 3 generated when being used are efficiently transferred to the fixing object such as the cooling base through the bottom plate 40. Accordingly, the reactor 1 has high heat-release performance. In particular, in the reactor 1, the junction layer 42 is formed of the insulating adhesive, and hence adhesion between the coil 2 and the magnetic core 3 with respect to the junction layer 42 is good. Accordingly, the heat of the coil 2 etc. is likely transferred to the bottom plate 40, and the reactor 1 has high heat-release performance.

Also, in the reactor 1, since the bottom plate 40 is formed of the material with high thermal conductivity, the heat from the coil 2 can be efficiently transferred to the fixing object, and hence has high heat-release performance. Further, in the reactor 1, although the bottom plate 40 is formed of the metallic material (the conductive material), since the junction layer 42 is formed of the insulating adhesive, insulation between the coil 2 and the bottom plate 40 can be ensured even when the junction layer 42 is as very thin as 0.4 mm. Also, since the junction layer 42 is thin, the heat of the coil 2 etc. is likely transferred to the fixing object through the bottom plate 40. Hence, the reactor 1 has high heat-release performance. Also, in the reactor 1, since the thermal conductivity of the junction layer 42 is higher than 2 W/m·K, the junction layer 42 has high thermal conductivity. Since the junction layer 42 with high thermal conductivity is arranged between the bottom plate 40 and the coil 2, the reactor 1 has high heat-release performance.

Also, since the reactor 1 includes the case 4, the assembly 10 can be protected from the environment, and can have mechanical protection. Although the reactor 1 includes the case 4, since the side wall 41 is formed of the resin, the weight of the reactor 1 is small. In addition, since the distance between the outer peripheral surface of the coil 2 and the inner peripheral surface of the side wall 41 can be decreased, the reactor 1 is small. Also, since the junction layer 42 is thin as described above and the distance between the coil-installation surface of the coil 2 and the inner surface of the bottom plate 40 can be decreased, the reactor 1 is small.

Further, in the reactor 1, since the bottom plate 40 and the side wall 41 are separate members and are combined to be integrated, the junction layer 42 may be formed on the bottom plate 40 while the side wall 41 is removed. Accordingly, with the reactor 1, the junction layer 42 can be easily formed, and hence productivity is high. Also, the assembly 10 can be joined to the bottom plate 40 including the junction layer 42 while the side wall 41 is removed. Pressing is easily performed, and hence productivity is high. Further, since the bottom plate 40 and the side wall 41 are separate members, the materials of the bottom plate 40 and the side wall 41 may be different from each other. Hence, the materials can be selected from various choices.

In addition, since the bottom plate 40 and the side wall 41 are fixed with the adhesive, both the members can be sealed. Hence, when the case 4 is filled with the sealing resin, the sealing resin which is not hardened can be prevented from leaking to the outside of the case 4 from between the bottom plate 40 and the side wall 41 regardless of the kind of sealing resin. Accordingly, a packing can be omitted, and the number of parts can be decreased. Also, since the fixing uses the adhesive, other fixing members (bolts etc.) may be omitted, the number of parts can be decreased and the number of assembly steps can be decreased, and hence productivity is high. Further, since the packing or bolts are not required, the thickness of the bottom plate 40 or the side wall 41 does not have to be increased, or a thick portion such as a fixing portion of a bolt is not required. Hence, the reactor 1 is small.

Second Embodiment

Figure 5:
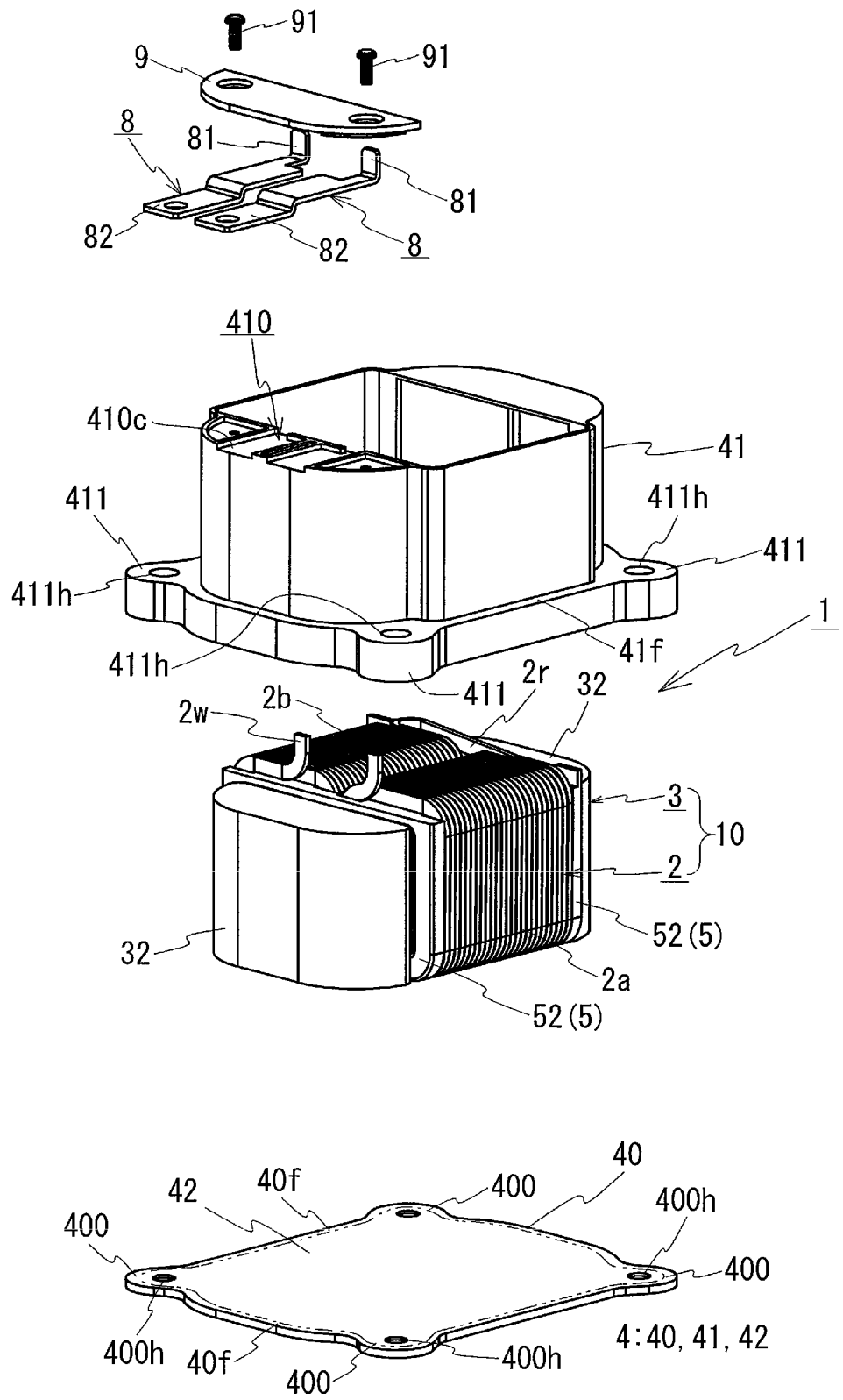
FIG. 5 is an exploded perspective view briefly showing a reactor according to a second embodiment.

Next, a reactor 1 according to a second embodiment is described with reference to FIG. 5. The reactor 1 according to the second embodiment includes a junction layer 42 that is formed of an insulating adhesive like the first embodiment. However, the second embodiment is different from the first embodiment in that this insulating adhesive is the same as the adhesive that fixes the bottom plate 40 and the side wall 41 of the case 4. Also, the second embodiment is different from the first embodiment in that the bottom plate 40 and the side wall 41 have flat surfaces, which contact the adhesive. Hereinafter, the different points are mainly described, and since the other configuration is similar to that of the first embodiment, the description thereof is omitted.

In the reactor 1 according to the second embodiment, the side wall 41 does not have the adhesive groove, and the bottom surface of the flange 41f is flat. The assembly 10 is housed in the case 4 including the side wall 41 as follows. As shown in FIG. 5, an insulating adhesive is applied on the entire surface of the bottom plate 40 by screen printing, and an adhesive layer formed of the insulating adhesive is formed on the entire surface of the bottom plate 40. Part (at least a portion on which the coil 2 of the assembly 10 is arranged) of the adhesive layer serves as a junction layer 42, and the other part serves as a region where both the bottom plate 40 and the side wall 41 are bonded. In this situation, the adhesive layer is formed of an adhesive with a thermal conductivity higher than 2 W/m·K like the first embodiment, and hence the region where both the members are bonded has high heat-release performance. That is, this embodiment has high heat-release performance since the entire inner surface of the bottom plate 40 has the adhesive layer with high heat-release performance. The assembly 10 is arranged and bonded at a predetermined position of the adhesive layer. Simultaneously with the arrangement of the assembly 10, the side wall 41 is mounted on the bottom plate 40. Since both the bottom plate 40 and the side wall 41 have the flat surfaces which contact the adhesive, an adhesive that fixes the bottom plate 40 and the side wall 41 together does not have to be applied to the side wall 41. The side wall 41 is fitted to the bottom plate 40 so that the outer peripheral edge of the bottom plate 40 contacts the inner peripheral edge of the weir formed at the side wall 41. Accordingly, both the members can be fixed without being shifted from each other. The adhesive is hardened in this state, and the assembly 10 and the side wall 41 are fixed to the bottom plate 40. The adhesive may use an adhesive with a thermal conductivity of 2 W/m·K or lower.

In this embodiment, since the adhesive that fixes the bottom plate 40 and the side wall 41 forming the case 4 is the same as the material (in this situation, the insulating adhesive) that forms the junction layer 42, the adhesive layer can be formed by applying the adhesive on the entire inner surface of the bottom plate 40. The step of applying the adhesive can be simplified. Also, in this embodiment, after the assembly 10 and the side wall 41 are bonded and fixed, the step of hardening the adhesive is performed only once. The number of working steps can be decreased, and hence productivity is high. Instead of applying the adhesive on the entire inner surface of the bottom plate 40 at a time, the adhesive may be applied individually to bonding surfaces of the bottom plate 40 and the side wall 41 of the case 4 and to the junction layer 42. At this time, the material and the number of layers of the adhesive applied to the bonding surfaces of the bottom plate 40 and the side wall 41 may be different from those of the adhesive applied to the junction layer. Alternatively, the adhesive may be applied only to the bonding surfaces of the bottom plate 40 and the side wall 41 and to the formation region of the junction layer 42 by using a mask with a predetermined shape. Accordingly, the adhesive can be simultaneously applied to both the bonding surfaces and the formation region of the junction layer 42, and the use amount of the adhesive can be decreased.

Also, in this embodiment, both the bottom plate 40 and the side wall 41 do not have the adhesive grooves, but have the flat surfaces which contact the adhesive. The configuration of both the members 40 and 41 can be simplified. In particular, the thickness of the bottom plate 40 can be decreased. Heat is easily transferred to the fixing object such as the cooling base, and the heat-release performance of the reactor 1 can be increased.

Third Embodiment

In a reactor according to a third embodiment, an adhesive that fixes the bottom plate 40 and the side wall 41 is the same as the insulating adhesive that forms the junction layer 42, like the reactor 1 according to the second embodiment. However, the third embodiment is different from the second embodiment in that the adhesive is a sheet-shaped adhesive. Hereinafter, the different point is mainly described, and since the other configuration is similar to that of the second embodiment, the description thereof is omitted.

The sheet-shaped adhesive is a sheet member that can be melted and hardened again at predetermined temperatures and that can be cut into a desirable shape. Hence, if the sheet-shaped adhesive is used, an adhesive layer integrally forming the junction layer 42 and a region where the bottom plate 40 and the side wall 41 are bonded can be easily formed. The sheet-shaped adhesive may be formed of insulating resin with a thermal conductivity of 0.1 W/m·K or higher, for example, epoxy resin. Since the sheet-shaped adhesive is formed of the insulating resin, even if the thickness is 1 mm or smaller, or 0.5 mm or smaller as described above, insulation between the coil 2 and the bottom plate 40 (particularly when being formed of a conductive material) can be sufficiently provided. For example, a sheet-shaped adhesive formed of epoxy resin (thermal conductivity: about 0.7 W/m·K, thickness (before bonding): about 0.5 mm) may be used.

Alternatively, a sheet-shaped adhesive in which a filler with high thermal conductivity and high electrical insulation performance is contained in base resin with high electrical insulation performance and hence has a thermal conductivity higher than 2 W/m·K may be used. For example, an adhesive in which base resin is formed of epoxy resin and spherical fine fillers are contained (for example, an adhesive with a thermal conductivity of about 2 to 2.5 W/m·K, more preferably 5 W/m·K or higher, or further preferably 10 W/m·K or higher) may be used. When the sheet-shaped adhesive with high thermal conductivity is used, the junction layer 42 also functions as a heat-release layer. Even if the thickness is increased by a certain degree, the heat-release performance is high. However, if the thickness is decreased to be in a range from about 0.1 to 0.15 mm, the distance between the coil 2 and the bottom plate 40 can be decreased, and hence the heat-release performance can be increased. The sheet-shaped adhesive may use known one or commercially available one.

In the reactor according to the third embodiment, the bottom plate 40 and the side wall 41 with flat surfaces which contact the adhesive may be used like the reactor 1 according to the second embodiment. Also, the reactor according to the third embodiment may be manufactured like the reactor 1 according to the second embodiment. More specifically, the sheet-shaped adhesive that is cut along the profile of the bottom plate 40 and becomes the predetermined shape is arranged on the bottom plate 40, the assembly 10 and the side wall 41 are arranged on the sheet-shaped adhesive, and then the sheet-shaped adhesive is melted and hardened again. With this hardening, a region of the sheet-shaped adhesive arranged between the bottom plate 40 and the side wall 41 integrates the bottom plate 40 with the side wall 41, and a region (the region becomes the junction layer 42) of the sheet-shaped adhesive arranged between the coil 2 of the assembly 10 and the bottom plate 40 fixes the coil 2 to the bottom plate 40 through the junction layer 42.

The reactor according to the third embodiment has the adhesive layer (the sheet-shaped adhesive) with high heat-release performance on the entire inner surface of the bottom plate 40, and hence the reactor has high heat-release performance, like the second embodiment. Also, with the reactor according to the third embodiment, the adhesive layer is formed more easily as compared with the second embodiment. The step does not become complicated, and hence productivity is high.

Even in this embodiment using the sheet-shaped adhesive, the above-described heat-release layer formed of ceramic may be included.

Fourth Embodiment

Figure 6:
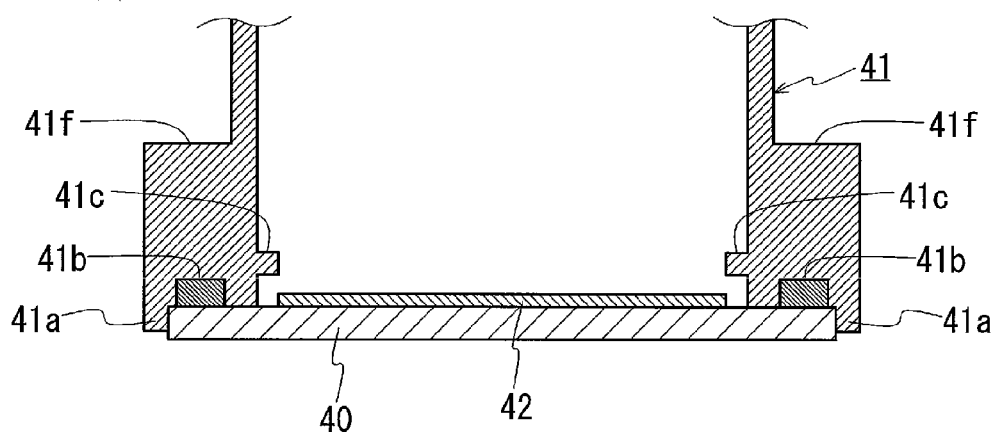
FIG. 6 shows a reactor according to a fourth embodiment. Part (A) is a cross-sectional view of a state in which a side wall is fixed to a bottom plate in a case. Part (B) is a cross-sectional view of a state in which an assembly is arranged in the case.
Figure 6:
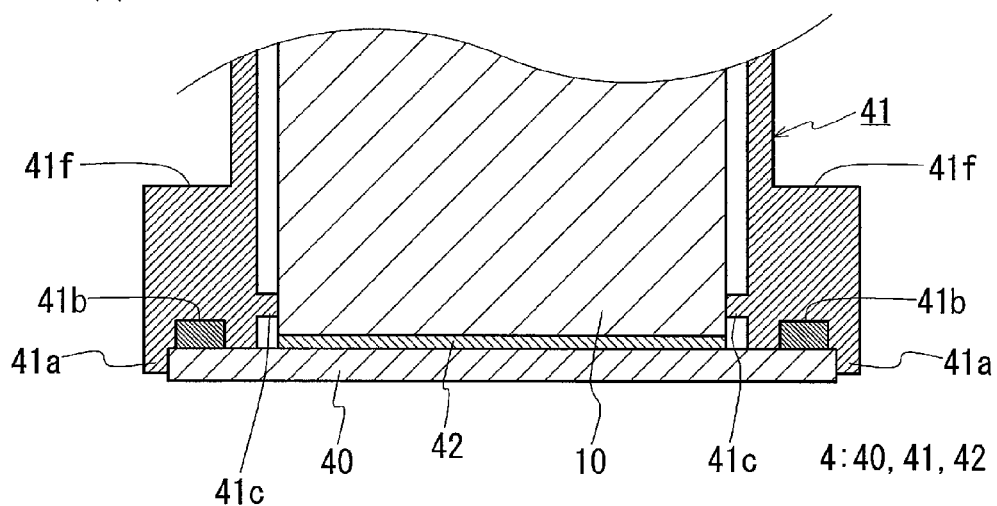

Next, a reactor according to a fourth embodiment is described with reference to FIG. 6. The reactor according to the fourth embodiment is different from the first embodiment in that a guide 41c is provided at the inner side of the side wall 41 of the case 4, for positioning the assembly 10. A method of manufacturing the reactor according to the fourth embodiment is different from the first embodiment in that the bottom plate 40 and the side wall 41 are integrated with an adhesive and then the assembly 10 is fixed to the bottom plate 40. Hereinafter, the different points are mainly described, and since the other configuration is similar to that of the first embodiment, the description thereof is omitted. In FIG. 6(B), the assembly 10 is schematically illustrated for the convenience of description. The actual assembly 10 includes the coil and the magnetic core at which the coil is arranged as described in the first embodiment.

The guide 41c performs positioning of the assembly 10 when the assembly 10 is fixed in the case 4 in which the bottom plate 40 and the side wall 41 are integrated. In this example, as shown in FIG. 6, the guide 41c is formed at the inner side of the side wall 41. More specifically, a protrusion protruding from the inner peripheral surface of the side wall 41 is provided. The protrusion functions as the guide 41c. The length of the guide 41c from the side wall 41 to the assembly 10 (the protruding length of the protrusion) is preferably a desirable length so that the assembly 10 is arranged at a predetermined position in the case 4. The guide 41c may be formed along the entire inner periphery of the side wall 41, or a plurality of guides may be discontinuously formed. In this example, the guide 41c has a rectangular cross-sectional shape; however, the cross-sectional shape may not be the rectangular shape and may be a polygonal shape or a semi-circular shape as long as the assembly 10 can be positioned at the predetermined position. The material of the guide 41c is preferably a non-metallic material such as resin, because the non-metallic material generally has high electrical insulation performance, and hence insulation between the assembly 10 and the side wall 41 can be increased. In this example, the guide 41c is formed of insulating resin that forms the side wall 41, and is integrally formed with the side wall 41.

The reactor with the above-described configuration may be manufactured as follows. First, as shown in FIG. 6(A), the bottom plate 40 and the side wall 41 are integrated with an adhesive. At this time, the side wall 41 is fitted to the bottom plate 40 such that the outer peripheral edge of the bottom plate 40 contacts the inner peripheral edge of the weir 41a formed at the side wall 41 while the adhesive groove 41b formed at the side wall 41 is filled with the adhesive. Accordingly, the side wall 41 can be positioned with respect to the bottom plate 40. Then, as shown in FIG. 6(B), the junction layer 42 with a predetermined shape is formed on one surface of the bottom plate 40, and the assembly 10 is fixed onto the junction layer 42. At this time, the assembly 10 is installed on the bottom plate 40 so that the assembly 10 contacts the tip end of the guide 41c formed at the side wall 41. Accordingly, the assembly 10 can be positioned with respect to the guide 41c. As the result, the three parts of the bottom plate 40, the side wall 41, and the assembly 10 can be easily positioned. In this embodiment, the terminal block 410 (see FIG. 3) and the side wall 41 are preferably separate members, and are preferably mounted after the assembly 10 is fixed. Alternatively, the junction layer 42 may be formed on the bottom plate 40 before the bottom plate 40 and the side wall 41 are integrated.

The reactor having the above-described configuration may be manufactured, for example, by simultaneously mounting the side wall and the assembly on the bottom plate while the adhesive is applied onto the entire inner surface of the bottom plate or while the sheet-shaped adhesive is arranged like the second or third embodiment, instead of the above-described method. At this time, the three parts of the bottom plate, the side wall, and the assembly can be easily positioned if the side wall and the assembly are aligned by the guide. Alternatively, the side wall can be arranged at a proper position, for example, by arranging the assembly on the bottom plate and then using the guide or the weir while the adhesive is applied onto the entire inner surface of the bottom plate or while the sheet-shaped adhesive is arranged. If the adhesive is not hardened when the side wall is arranged, the position of the assembly can be adjusted by the guide by a certain degree. Alternatively, as described according to the first embodiment, the assembly may be fixed on the bottom plate, and then the bottom plate and the side wall may be integrated with the adhesive.

First Modification

In any of the above-described embodiments, the bottom plate is formed of a material different from the material of the side wall. Alternatively, both the bottom plate and the side wall may be formed of the same material. For example, if both the members are formed of a metallic material with high heat-release performance, for example, aluminum, the heat-release performance of the reactor can be further increased. In particular, in this modification, if the sealing resin is provided, heat of the coil and heat of the magnetic core can be efficiently transferred to the case. In addition, if insulating resin is used for the sealing resin, insulation between the outer peripheral surface of the coil and the inner surface of the side wall can be increased. In this modification, if the junction layer is formed of an insulating material, even if the distance between the coil-installation surface of the coil and the inner surface of the bottom plate is decreased (i.e., even if the thickness of the junction layer is decreased), insulation between the coil and the bottom plate can be provided. Accordingly, the heat-release performance can be increased, and the size can be reduced. A distance is provided between the outer peripheral surface of the coil and the inner surface of the side wall to ensure the insulation performance.

Second Modification

In any of the above-described embodiments, only the junction layer formed of an insulating adhesive is provided between the coil and the bottom plate. Alternatively, a heat-release layer formed of ceramic, such as aluminum nitride or alumina, and a junction layer made of an insulating adhesive may be provided.

Third Modification

In any of the above-described embodiments, the peripheral wall part 51 and the frame-shaped part 52 of the insulator 5 are not integrated. Alternatively, like an insulator 5α shown in FIG. 7, a peripheral wall part 51α and a frame-shaped part 52α may be engaged with each other and integrated. In this situation, the insulator 5α is described in detail. The other configuration is similar to that in any of the above-described embodiments, and the description thereof is omitted.

The insulator 5α includes a pair of tube-shaped peripheral wall parts 51α that house the inner cores 31 of the magnetic core 3, and a pair of frame-shaped parts 52α that contact the inner cores 31 and the outer cores 32. Each peripheral wall 51α is a tube-shaped member extending along the external shape of the inner core 31, and has fitting portions 510 respectively at both ends thereof. Fitting portions 520 of the frame-shaped parts 52α are fitted to the fitting portions 510. Each frame-shaped part 52α is a flat plate like the frame-shaped part 52 of any embodiment, and has a pair of openings into which the inner cores 31 are respectively inserted. The fitting portions 520 are provided at a side of the openings that contact the peripheral wall part 51α, like the peripheral wall 51α. An angular-bracket-like frame portion 521 is provided at a side of the openings that contact the outer core 32. The frame portion 521 positions the outer core 32. Since the fitting portion 510 of the peripheral wall part 51α is fitted to the fitting portion 520 of the frame-shaped part 52α, the mutual positions can be held.

The assembly is formed by using the insulator 5α as follows. First, one of the outer cores 32 is placed while the inner end surface of the outer core 32 faces the upper side, one of the frame-shaped parts 52α is slid from the opening side of the frame portion 521, and the frame portion 521 is fitted to the outer core 32. In this step, the one of the outer cores 32 is positioned with respect to the one of the frame-shaped parts 52α.

Then, the fitting portions 510 of the peripheral wall parts 51α are fitted to the fitting portion 520 of the one of the frame-shaped parts 52α, and hence the pair of peripheral wall parts 51α are mounted to the frame-shaped part 52α. In this step, the positional relationship between the one frame-shaped part 52α and the peripheral wall parts 51α are held.

Then, the core pieces 31m and the gap members 31g are alternately inserted into each of the peripheral wall parts 51α and are stacked. The stacked state of the stacked inner core 31 is held by the peripheral wall part 51α. In this situation, the peripheral wall part 51α has slits that are open to the upper side, at a pair of side surfaces thereof. When the core pieces 31m and the gap members 31g are inserted into the peripheral wall part 51α, the core pieces 31m can be supported by fingers etc., and thus the inserting work can be easily performed with safety.

Then, both the coil elements are mounted on the outer peripheries of the peripheral wall parts 51α while the coil coupling portion of the coil (not shown) faces the lower side. Then, the other frame-shaped part 52α is mounted to the peripheral wall parts 51α, and the other outer core 32 is mounted to the other frame-shaped part 52α as described above, In this step, the positional relationship between the peripheral wall parts 51α and the other frame-shaped part 52α is held, and the other outer core 32 is positioned with respect to the other frame-shaped part 52α. With the step, the assembly of the coil and the magnetic core 3 is obtained.

Since the insulator 5α is used, an adhesive can be omitted when the magnetic core 3 is formed like any of the above-described embodiments. In particular, the insulator 5α easily maintains the integrated state because the peripheral wall parts 51α are engaged with the frame-shaped parts 52α, and is easily handled, for example, when the assembly is arranged on the bottom plate of the case.

Further, if the rear surface of the one outer core 32 contacts the side wall of the case, and a member (for example, leaf spring) that presses the other outer core 32 to the one outer core 32 is inserted between the rear surface of the other outer core 32 and the side wall, the gap length can be prevented from being changed due to an external factor, such as vibration or an impact. In the modification where the pressing member is used, if the gap member 31g is an elastic gap member formed of an elastic material, such as silicone rubber or fluorine rubber, the gap length can be adjusted and a dimensional error can be absorbed by a certain degree because the gap member 31g is deformed. The pressing member and the elastic gap member may be used in any of the above-described embodiments and modifications, and modifications described later.

Fourth Modification

Alternatively, for example, there may be another configuration not using an adhesive when the magnetic core 3 is formed, but using a strip-shaped clamping member (not shown) that can hold the magnetic core in a ring-shaped manner. For example, the strip-shaped clamping member may include a strip portion arranged at the outer periphery of the magnetic core, and a lock portion that is mounted at one end of the strip portion and fixes a loop formed by the strip portion so that the loop has a predetermined length. The lock portion may include an insertion hole through which the other end region of the strip portion having a rib is inserted, and a tooth portion that is provided at the insertion hole and bites into the rib of the strip portion. The rib in the other end region of the strip portion and the tooth portion of the lock portion form a ratchet mechanism. Hence, the ratchet mechanism that can fix the loop with the predetermined length can be preferably used.

The material of the strip-shaped clamping member may be a material having heat resistance that can resist a temperatures during use of the reactor. For example, the material may be a metallic material such as stainless steel, or a non-metallic material, such as heat-resistant polyamide resin, polyetheretherketone (PEEK) resin, polyethylene terephthalate (PET) resin, polytetrafluoroethylene (PTFE) resin, or polyphenylene sulfide (PPS) resin. A commercially available tie member, for example, a tie wrap (registered trademark of Thomas & Betts International Inc.), a peek tie (a tie band manufactured by Hellermann Tyton Co., Ltd.), or a stainless steel band (manufactured by Panduit Corporation) may be used.

The strip-shaped clamping member can fix the magnetic core in a ring-shaped manner, for example, by arranging the strip portion on the outer periphery of the one outer core, between the outer periphery of the one inner core and the inner peripheral surface of the coil element, on the outer periphery of the other outer core, and then between the outer periphery of the other inner core and the inner peripheral surface of the coil element, and by fixing the loop length by the lock portion. Alternatively, after the assembly of the coil and the magnetic core is assembled as described in any of the embodiments etc., the strip portion may be arranged to surround the outer cores and the outer peripheries of the coils and then the loop length may be fixed. Since the strip-shaped clamping member is used, the magnetic core can be integrated without use of an adhesive. For example, when the assembly is arranged on the bottom plate, the assembly can be easily handled. Also, the distance between the core pieces can be easily held.

Further, if a cushioning member is arranged between the outer periphery of the magnetic core or the outer periphery of the coil and the strip-shaped clamping member, the magnetic core or the coil can be prevented from being damaged by a clamping force of the strip-shaped clamping member. The material, thickness, number, and arrangement position of the cushioning member may be properly selected so that the clamping force by which the predetermined shape of the ring-shaped magnetic core can be held acts on the magnetic core. For example, a molded product with a thickness in a range from about 0.5 to 2 mm which is molded of resin, such as ABS resin, PPS resin, PBT resin, or epoxy resin, into a shape corresponding to the core shape; or a rubber-like plate member of, for example, silicone rubber may be used for the cushioning member.

Fifth Embodiment

The reactor according to any of the first to fourth embodiments and modifications may be used for a component of a converter mounted on a vehicle or the like, or a component of an electric power converter including the converter.

Figure 8:
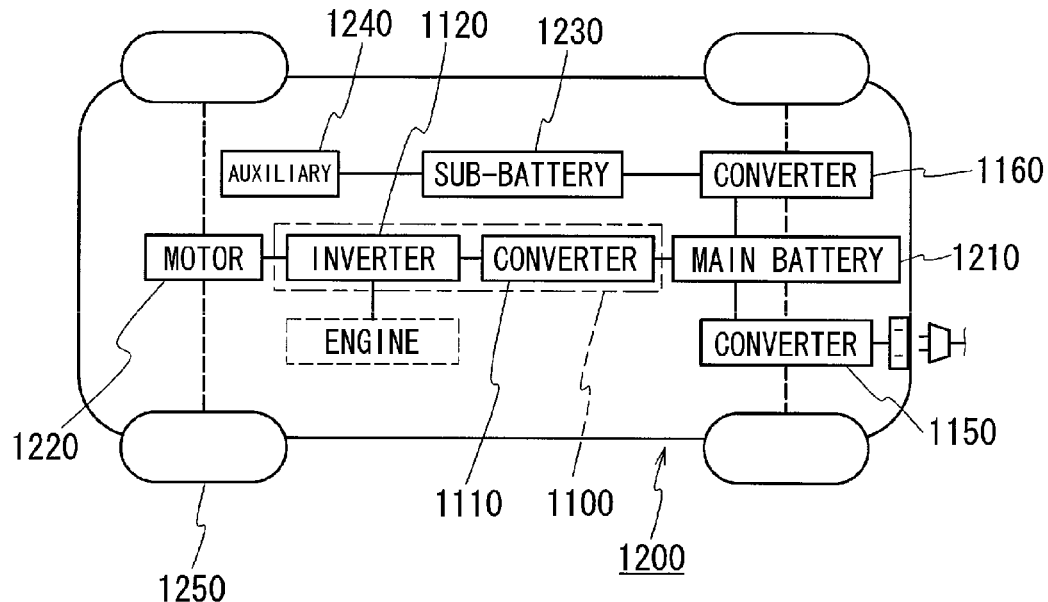
FIG. 8 is a brief configuration diagram schematically showing a power supply system of a hybrid electric vehicle.

For example, as shown in FIG. 8, a vehicle 1200, which is a hybrid electric vehicle or an electric vehicle, includes a main battery 1210, an electric power converter 1100 connected to the main battery 1210, and a motor (a load) 1220 driven by a power fed from the main battery 1210 and used for traveling. The motor 1220 is typically a three-phase alternating current motor. The motor 1220 drives wheels 1250 during traveling and functions as a generator during regeneration. In case of a hybrid electric vehicle, the vehicle 1200 includes an engine in addition to the motor 1220. FIG. 8 illustrates an inlet as a charging portion of the vehicle 1200; however, a plug may be included.

The electric power converter 1100 includes a converter 1110 connected to the main battery 1210, and an inverter 1120 that is connected to the converter 1110 and performs conversion between direct current and alternating current. During traveling of the vehicle 1200, the converter 1110 steps up a direct-current voltage (input voltage) of the main battery 1210, which is in a range from 200 to 300 V, to a level in a range from about 400 to 700 V, and then feeds the power to the inverter 1120. Also, during regeneration, the converter 1110 steps down the direct-current voltage (the input voltage) from the motor 1220 through the inverter 1120 to a direct-current voltage suitable for the main battery 1210, and then uses the direct-current voltage for the charge of the main battery 1210. During traveling of the vehicle 1200, the inverter 1120 converts the direct current stepped up by the converter 1110 into predetermined alternating current and feeds the alternating current to the motor 1220. During regeneration, the inverter 1120 converts the alternating current output from the motor 1220 into direct current and outputs the direct current to the converter 1110.

Figure 9:
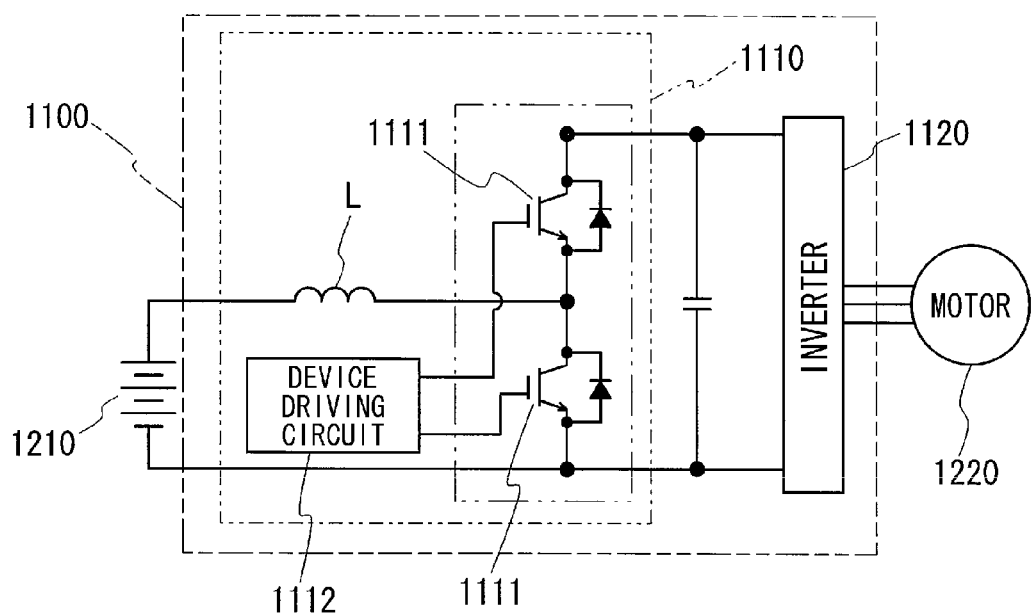
FIG. 9 is a brief circuit diagram showing an example of an electric power converter according to the invention including a converter according to the invention.

As shown in FIG. 9, the converter 1110 includes a plurality of switching elements 1111, a driving circuit 1112 that controls operations of the switching elements 1111, and a reactor L. The converter 1110 converts the input voltage (in this situation, performs step up and down) by repetition of on and off operations (switching operations). The switching elements 1111 each use a power device, such as field effect transistor (FET) or an insulated-gate bipolar transistor (IGBT). The reactor L uses a characteristic of a coil that disturbs a change of current which flows through the circuit, and hence has a function of making the change smooth when the current is increased or decreased by the switching operation. The reactor L is the reactor according to any of the embodiments and modifications. Since the small reactor 1 with high heat-release performance is included, the electric power converter 1100 and the converter 1110 can contribute to reduction in size.

The vehicle 1200 includes, in addition to the converter 1110, a feeding device converter 1150 connected to the main battery 1210, and an auxiliary power supply converter 1160 that is connected to a sub-battery 1230 serving as a power source of an auxiliary 1240 and the main battery 1210 and that converts a high voltage of the main battery 1210 to a low voltage. The converter 1110 typically performs DC-DC conversion, whereas the feeding device converter 1150 and the auxiliary power supply converter 1160 perform AC-DC conversion. The feeding device converter 1150 may include a kind that performs DC-DC conversion. The feeding device converter 1150 and the auxiliary power supply converter 1160 each may include a configuration similar to the reactor according to any of the above-described embodiments and modifications, and the size and shape of the reactor may be properly changed. Also, the reactor according to any of the above-described embodiments and modifications may be used for a converter that performs conversion for the input power and that performs only stepping up or stepping down.

The invention is not limited to the above-described embodiments, and may be properly modified without departing from the scope of the invention.

INDUSTRIAL APPLICABILITY

The reactor according to the invention can be preferably used for a component of an electric power converter, such as an on-vehicle converter mounted on a vehicle, such as a hybrid electric vehicle, an electric vehicle, or a fuel cell vehicle.

REFERENCE SIGNS LIST 1 reactor
2 coil
2a, 2b coil element
2r coil coupling portion
2w wire
3 magnetic core
31 inner core
31e end surface
31m core piece
31g gap member
32 outer core
32e inner end surface
4 case
40 bottom plate
40f junction region
41 side wall
41d bottom surface
41f flange
41a weir
41b adhesive groove
41c guide
42 junction layer
400, 411 mount portion
400h, 411h bolt hole
410 terminal block
410c recessed groove
5, 5α insulator
51, 51α peripheral wall part
52, 52α frame-shaped part
52f mount
510, 520 fitting portion
521 frame portion
8 terminal piece
81 welding surface
82 connection surface
9 terminal fixing member
91 bolt
10 assembly
1100 electric power converter
1110 converter
1111 switching element
1112 driving circuit
L reactor
1120 inverter
1150 feeding device converter
1160 auxiliary power supply converter
1200 vehicle
1210 main battery
1220 motor
1230 sub-battery
1240 auxiliary
1250 wheel

The invention claimed is:

1. A reactor comprising an assembly and a case, the assembly having a coil and a magnetic core at which the coil is arranged, the case housing the assembly,
wherein the case includes
a bottom plate that contacts a fixing object when the reactor is installed on the fixing object,
a side wall that is mounted on the bottom plate with an adhesive and surrounds the assembly, and
a junction layer that fixes the coil to an inner surface of the bottom plate,
wherein the bottom plate and the side wall are separate members, and
wherein the bottom plate has a thermal conductivity that is equivalent to or higher than a thermal conductivity of the side wall.

2. The reactor according to claim 1, wherein the junction layer is formed of an insulating material with a thermal conductivity of 0.1 W/m·K or higher.

3. The reactor according to claim 1, wherein at least one of the bottom plate and the side wall has a weir that prevents the adhesive from leaking to outside of the case from between the bottom plate and the side wall when the side wall is mounted on the bottom plate.

4. The reactor according to claim 1, wherein at least one of the bottom plate and the side wall has an adhesive groove that is filled with the adhesive.

5. The reactor according to claim 1, wherein at least one of the bottom plate and the side wall has a flat surface that contacts the adhesive.

6. The reactor according to claim 1, wherein the side wall has a guide at an inner side thereof, the guide positioning the assembly.

7. The reactor according to claim 1,
wherein the junction layer has at least a single adhesive layer that is formed of an insulating adhesive, and
wherein the bottom plate is formed of a conductive material.

8. The reactor according to claim 7, wherein the adhesive is the same as the insulating adhesive that forms the junction layer.

9. The reactor according to claim 7, wherein the adhesive is different from the insulating adhesive that forms the junction layer.

10. The reactor according to claim 1, wherein the junction layer and the adhesive are integrally formed of a sheet-shaped adhesive arranged on the inner surface of the bottom plate.

11. The reactor according to claim 1, wherein the side wall is formed of an insulating material.

12. The reactor according to claim 1,
wherein the junction layer has a multi-layer structure formed of an epoxy-base adhesive containing a filler formed of alumina,
wherein the bottom plate is formed of a material selected from aluminum and an aluminum alloy, and
wherein the side wall is formed of insulating resin.

13. A converter comprising a switching element, a driving circuit that controls an operation of the switching element, and a reactor that smoothens a switching operation, the converter converting an input voltage by the operation of the switching element,
wherein the reactor is the reactor according to claim 1.

14. An electric power converter comprising a converter that converts an input voltage, and an inverter that is connected to the converter and performs conversion between direct current and alternating current, the electric power converter driving a load with power converted by the inverter,
wherein the converter is the converter according to claim 13.

15. The reactor according to claim 1, wherein a thickness of the junction layer is 1 mm or smaller.

* * * * *